United States Patent
Seo et al.

(10) Patent No.: US 11,057,182 B2
(45) Date of Patent: *Jul. 6, 2021

(54) METHOD AND APPARATUS FOR TRANSMITTING RECEPTION ACKNOWLEDGEMENT IN WIRELESS COMMUNICATION SYSTEM

(71) Applicant: LG Electronics Inc., Seoul (KR)

(72) Inventors: Dong Youn Seo, Anyang-si (KR); Min Gyu Kim, Anyang-si (KR); Suck Chel Yang, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 41 days.

This patent is subject to a terminal disclaimer.

(21) Appl. No.: 16/710,419

(22) Filed: Dec. 11, 2019

(65) Prior Publication Data
US 2020/0119886 A1    Apr. 16, 2020

Related U.S. Application Data

(63) Continuation of application No. 15/367,787, filed on Dec. 2, 2016, now Pat. No. 10,536,251, which is a
(Continued)

(51) Int. Cl.
*H04L 5/00* (2006.01)
*H04L 1/18* (2006.01)
(Continued)

(52) U.S. Cl.
CPC .......... *H04L 5/0055* (2013.01); *H04L 1/1861* (2013.01); *H04L 1/1896* (2013.01);
(Continued)

(58) Field of Classification Search
CPC ..... H04L 1/1861; H04L 1/1896; H04L 5/001; H04L 5/0055; H04W 24/08; H04W 72/0413; H04W 72/042
See application file for complete search history.

(56) References Cited

U.S. PATENT DOCUMENTS 8,687,579 B2    4/2014   Wu et al. ................ 370/329
9,544,790 B2 *  1/2017   Seo .................. H04L 5/001
(Continued)

FOREIGN PATENT DOCUMENTS

WO    2010053984 A2    5/2010

OTHER PUBLICATIONS

U.S. Appl. No. 15/367,787, filed Dec. 2, 2016.
U.S. Appl. No. 14/129,479, filed May 7, 2014 (U.S. Pat No. 9,544,790).

*Primary Examiner* — Kashif Siddiqui
(74) *Attorney, Agent, or Firm* — Dentons US LLP

(57) ABSTRACT

Provided are a method and apparatus for transmitting acknowledgement/not-acknowledgement (ACK/NACK) of a user equipment in a carrier aggregation system. The method includes: assigning first and second control regions as search spaces for a specific cell; detecting scheduling information with respect to the specific cell from the first control region and/or second control region; receiving a data channel from the specific cell on the basis of the scheduling information; and transmitting ACK/NACK indicating a reception acknowledgement for the data channel, wherein if the scheduling information is detected from the first control region, the ACK/NACK is transmitted using a radio resource linked to another radio resource used to receive the scheduling information, and wherein if the scheduling information is detected from the second control region, the ACK/NACK is transmitted using a pre-set radio resource through a higher layer signal.

18 Claims, 18 Drawing Sheets

Related U.S. Application Data continuation of application No. 14/129,479, filed as application No. PCT/KR2012/005142 on Jun. 28, 2012, now Pat. No. 9,544,790.

(60) Provisional application No. 61/550,441, filed on Oct. 23, 2011, provisional application No. 61/501,773, filed on Jun. 28, 2011.

(51) Int. Cl.
*H04W 24/08* (2009.01)
*H04W 72/04* (2009.01)

(52) U.S. Cl.
CPC ............ *H04L 5/001* (2013.01); *H04W 24/08* (2013.01); *H04W 72/042* (2013.01); *H04W 72/0413* (2013.01)

(56) References Cited

U.S. PATENT DOCUMENTS

| | | | | |
|---|---|---|---|---|
| 10,536,251 B2 * | 1/2020 | Seo | ......... | H04L 5/0055 |
| 2009/0238091 A1 | 9/2009 | Kim | ......... | H04L 5/0091 |
| | | | | 370/252 |
| 2009/0262854 A1 | 10/2009 | Lee | ......... | H04B 7/0417 |
| | | | | 375/267 |
| 2010/0054358 A1 | 3/2010 | Ko | ......... | H04B 7/0639 |
| | | | | 375/267 |
| 2010/0150089 A1 | 6/2010 | Yu et al. | | |
| 2010/0151874 A1 | 6/2010 | Cai | ......... | H04W 76/06 |
| | | | | 455/452.1 |
| 2010/0165847 A1 | 7/2010 | Kamuf et al. | | |
| 2010/0260130 A1 | 10/2010 | Earnshaw | ......... | H04L 1/1812 |
| | | | | 370/329 |
| 2010/0279628 A1 | 11/2010 | Love | ......... | H04L 5/0091 |
| | | | | 455/70 |
| 2010/0290418 A1 | 11/2010 | Nishio et al. | ......... | 370/329 |
| 2010/0331030 A1 | 12/2010 | Nory | ......... | H04L 5/0053 |
| | | | | 455/509 |
| 2011/0075624 A1 | 3/2011 | Papasakellariou et al. | | |
| 2011/0110441 A1 | 5/2011 | Chen | ......... | H04L 5/0007 |
| | | | | 375/260 |
| 2011/0128883 A1 | 6/2011 | Chung | ......... | H04B 7/155 |
| | | | | 370/252 |
| 2011/0223924 A1 | 9/2011 | Lohr | ......... | H04W 72/042 |
| | | | | 455/450 |
| 2011/0300854 A1 | 12/2011 | Shan | ......... | H04L 1/1887 |
| | | | | 455/422.1 |
| 2011/0310856 A1 | 12/2011 | Hariharan et al. | ......... | 370/336 |
| 2012/0106465 A1 | 5/2012 | Haghighat et al. | ......... | 370/329 |
| 2012/0127938 A1 | 5/2012 | Lv | ......... | H04W 72/1205 |
| | | | | 370/329 |
| 2012/0257552 A1 | 10/2012 | Chen et al. | ......... | 370/280 |
| 2012/0281646 A1 | 11/2012 | Liao et al. | ......... | 370/329 |
| 2012/0320847 A1 | 12/2012 | Nam | ......... | H04W 72/0406 |
| | | | | 370/329 |
| 2012/0320848 A1 | 12/2012 | Chen | ......... | H04L 5/0055 |
| | | | | 370/329 |
| 2013/0039284 A1 | 2/2013 | Marinier | ......... | H04L 5/001 |
| | | | | 370/329 |
| 2013/0051355 A1 | 2/2013 | Hong | ......... | H04J 11/0073 |
| | | | | 370/329 |
| 2013/0051356 A1 | 2/2013 | Hong | ......... | H04L 27/2602 |
| | | | | 370/329 |
| 2013/0343311 A1 | 12/2013 | Tee et al. | ......... | 370/329 |

* cited by examiner

METHOD AND APPARATUS FOR TRANSMITTING RECEPTION ACKNOWLEDGEMENT IN WIRELESS COMMUNICATION SYSTEM

This application is a continuation of, and claims priority to, U.S. patent application Ser. No. 15/367,787 filed Dec. 2, 2016, which is a continuation of U.S. patent application Ser. No. 14/129,479 filed May 7, 2014 (now issued as U.S. Pat. No. 9,544,790), which is a National Stage Entry of International Application No. PCT/KR2012/005142 filed Jun. 28, 2012, and claims priority to U.S. Provisional Application Nos. 61/501,773 filed Jun. 28, 2011 and 61/550,441 filed Oct. 23, 2011, all of which are hereby incorporated by reference in their entireties as if fully set forth herein.

BACKGROUND OF THE INVENTION

Field of the Invention

The present invention relates to wireless communications, and more particularly, to a method and apparatus for acknowledgement/not-acknowledgement (ACK/NACK) transmission indicating a reception acknowledgement in a wireless communication system supporting a carrier aggregation.

Related Art

One of the most important requirements of a next generation wireless communication system is to support a high data rate. For this, various techniques such as multiple input multiple output (MIMO), cooperative multiple point transmission (CoMP), relay, etc., have been under research, but the most fundamental and reliable solution is to increase a bandwidth.

However, a frequency resource is in a saturation state at present, and various schemes are partially used in a wide frequency band. For this reason, in order to ensure a broadband bandwidth to satisfy a required higher data rate, a system is designed such that a basic requirement which allows separate bands to operate respective independent systems is satisfied, and a carrier aggregation (CA) is introduced. In concept, the CA aggregates a plurality of bands into one system. In this case, a band that can be independently managed is defined as a component carrier (CC).

The latest communication standard (e.g., 3GPP LTE-A or 802.16m) considers to expand its bandwidth to 20 MHz or higher. In this case, a wideband is supported by aggregating one or more CCs. For example, if one CC corresponds to a bandwidth of 5 MHz, four carriers are aggregated to support a bandwidth of up to 20 MHz. As such, a system supporting carrier aggregation is called a carrier aggregation system.

Meanwhile, a wireless communication system considers a system in which a base station supports a more number of user equipments in comparison with the legacy system. For example, one base station may have to support the more number of user equipments when a technique such as machine type communication (MTC), enhanced multi user multi input multi output (MIMO), etc., is applied.

In this case, it may be difficult to transmit control information to a plurality of user equipments when using only a radio resource region conventionally used to transmit the control information. In order to solve such a problem, it is considered to allocate a new control region to the radio resource region in which data is transmitted in the legacy system.

However, if scheduling information for data transmission/reception is transmitted through a new control region in a carrier aggregation system, there is a need to determine a specific method by which a user equipment transmits ACK/NACK for the data.

SUMMARY OF THE INVENTION

The present invention provides a method and apparatus for transmitting acknowledgement/not-acknowledgement (ACK/NACK) in a carrier aggregation system.

According to an aspect of the present invention, a method of transmitting acknowledgement/not-acknowledgement (ACK/NACK) of a user equipment in a carrier aggregation system is provided. The method includes: assigning first and second control regions as search spaces for a specific cell; detecting scheduling information with respect to the specific cell from the first control region and/or second control region; receiving a data channel from the specific cell on the basis of the scheduling information; and transmitting ACK/NACK indicating a reception acknowledgement for the data channel, wherein if the scheduling information is detected from the first control region, the ACK/NACK is transmitted using a radio resource linked to another radio resource used to receive the scheduling information, and wherein if the scheduling information is detected from the second control region, the ACK/NACK is transmitted using a pre-set radio resource through a higher layer signal.

In the aforementioned aspect of the present invention, in a subframe consisting of a plurality of orthogonal frequency division multiplexing (OFDM) symbols in a time domain and consisting of a plurality of subcarriers in a frequency domain, the first control region may be located in up to four first OFDM symbols of the subframe and the second control region may be located in OFDM symbols located after the first control region.

In addition, if scheduling information for scheduling the data channel is detected from the first control region of the subframe and if the second control region collides with a radio resource constituting the data channel, scheduling information detection may not be attempted in the second control region in which the collision occurs.

In addition, if scheduling information for scheduling the data channel is not detected from the first control region of the subframe and if the second control region collides with a radio resource constituting the data channel, the second control region may be punctured or rate-matched.

In addition, if the specific cell is a primary cell in which the user equipment performs an initial connection establishment procedure or a connection re-establishment procedure with respect to a base station, the scheduling information may be detected only from the first control region.

In addition, if the specific cell is a secondary cell additionally allocated in addition to the primary cell, the scheduling information may be detected only from the second control region.

In addition, the higher layer signal may be a radio resource control (RRC) message.

In addition, the user equipment may attempt to detect only some downlink control information (DCI) formats among a plurality of DCI formats in the first control region.

In addition, a search space for attempting to detect only the some DCI formats may be limited to a common search space (CSS) in which common DCI for a plurality of user equipments is transmitted.

According to another aspect of the present invention, there is provided a user equipment comprising: a radio frequency (RF) unit for transmitting and receiving a radio signal; and a processor coupled to the RF unit, wherein the processor assigns first and second control regions as search spaces for a specific cell, detects scheduling information with respect to the specific cell from the first control region and/or second control region, receives a data channel from the specific cell on the basis of the scheduling information, and transmits ACK/NACK indicating a reception acknowledgement for the data channel, and wherein if the scheduling information is detected from the first control region, the ACK/NACK is transmitted using a radio resource linked to another radio resource used to receive the scheduling information, and wherein if the scheduling information is detected from the second control region, the ACK/NACK is transmitted using a pre-set radio resource through a higher layer signal.

According to the present invention, acknowledgement/not-acknowledgement (ACK/NACK) can be efficiently transmitted by using different resources depending on a specific control region for transmitting scheduling information in a wireless communication system in which an additional control region is assigned in addition to the existing control region.

DESCRIPTION OF EXEMPLARY EMBODIMENTS

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiple access (SC-FDMA) in an uplink. LTE-advance (LTE-A) is an evolution of the LTE. For clarity, the following description will focus on the 3GPP LTE/LTE-A. However, technical features of the present invention are not limited thereto.

A wireless communication system includes at least one base station (BS). Each BS provides a communication service to a specific geographical region. The geographical region may be divided into a plurality of sub-regions. The BS is generally a fixed station that communicates with a user equipment (UE) and may be referred to as another terminology, such as an evolved Node-B (eNB), a base transceiver system (BTS), an advanced base station (ABS), etc.

The UE may be fixed or mobile, and may be referred to as another terminology, such as a mobile station (MS), a user terminal (UT), a subscriber station (SS), a wireless device, a personal digital assistant (PDA), a wireless modem, a handheld device, an access terminal (AT), etc.

Hereinafter, a downlink (DL) implies communication from the BS to the UE, and an uplink (UL) implies communication from the UE to the BS.

The wireless communication system may be a system supporting bidirectional communication. The bidirectional communication may be performed by using a time division duplex (TDD) mode, a frequency division duplex (FDD) mode, etc. When in the TDD mode, UL transmission and DL transmission use different time resources. When in the FDD mode, UL transmission and DL transmission use different frequency resources. The BS and the UE can communicate with each other by using a radio resource called a radio frame.

Figure 1:
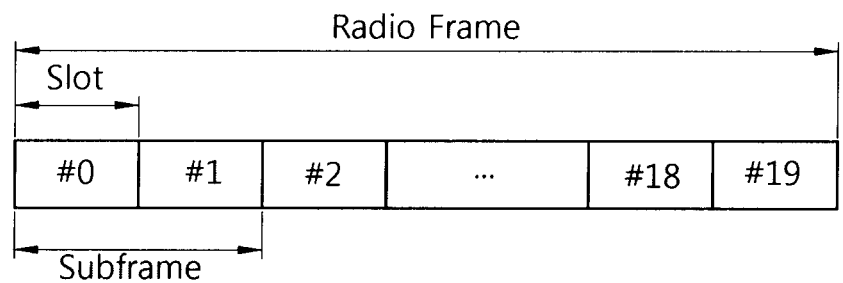
FIG. 1 shows a radio frame structure.

FIG. 1 shows a radio frame structure.

Referring to FIG. 1, a radio frame (simply also referred to as a frame) consists of 10 subframes in a time domain. One subframe consists of 2 slots in the time domain. One subframe may have a length of 1 millisecond (ms), and one slot may have a length of 0.5 ms. A time for transmitting one subframe is defined as a transmission time interval (TTI). The TTI may be a minimum unit of scheduling.

One slot may include a plurality of orthogonal frequency division multiplexing (OFDM) symbols in the time domain. Since the 3GPP LTE uses OFDMA in a downlink, one symbol period is represented with the OFDM symbol. The OFDM symbol can be referred to as other terms according to a multiple access scheme. For example, the OFDM symbol can also be referred to as an SC-FDMA symbol when SC-FDMA is used as an uplink multiple-access scheme. Although it is described herein that one slot includes 7 OFDM symbols, the number of OFDM symbols included in one slot may change depending on a cyclic prefix (CP) length. According to 3GPP TS 36.211 V8.5.0 (2008-12), in case of a normal CP, one subframe includes 7 OFDM symbols, and in case of an extended CP, one subframe includes 6 OFDM symbols. The radio frame structure is for exemplary purposes only, and thus the number of subframes included in the radio frame and the number of slots included in the subframe may change variously.

Figure 2:
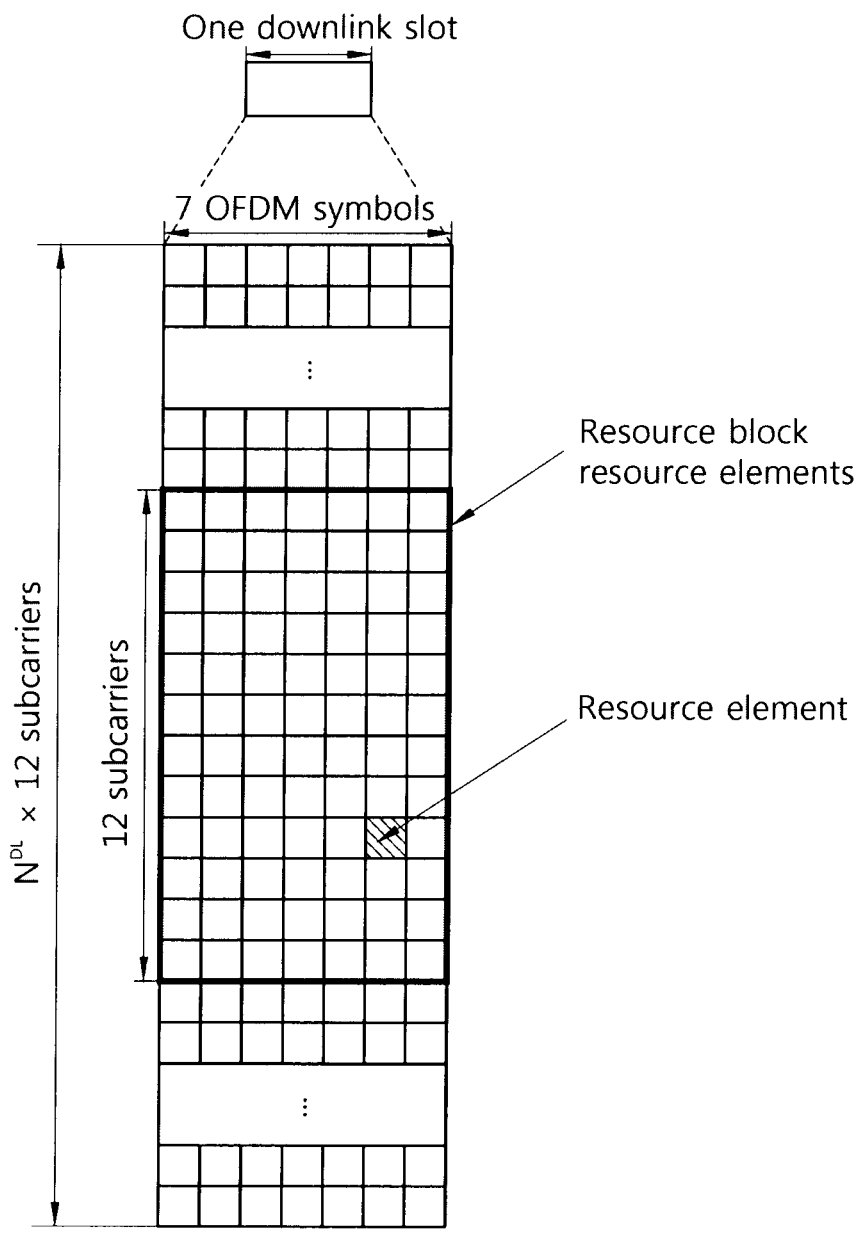
FIG. 2 shows an example of a resource grid for one downlink (DL) slot.

FIG. 2 shows an example of a resource grid for one DL slot.

Referring to FIG. 2, the DL slot includes a plurality of OFDM symbols in a time domain, and includes $N_{RB}$ resource blocks (RBs) in a frequency domain. The RB includes one slot in the time domain in a unit of resource allocation, and includes a plurality of consecutive subcarriers in the frequency domain. The number $N_{RB}$ of RBs included in the DL slot depends on a DL transmission bandwidth configured in a cell. For example, in the LTE system, $N_{RB}$ may be any one value in the range of 60 to 110. A structure of a UL slot may be the same as the aforementioned structure of the DL slot.

Each element on the resource grid is referred to as a resource element (RE). The RE on the resource grid can be identified by an index pair (k,l) within the slot. Herein, k (k=0, . . . , $N_{RB}$×12-1) denotes a subcarrier index in the frequency domain, and l (l=0, . . . , 6) denotes an OFDM symbol index in the time domain.

Although it is described in FIG. 2 that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. The number of subcarriers in one OFDM symbol may be any one value selected from 128, 256, 512, 1024, 1536, and 2048.

Figure 3:
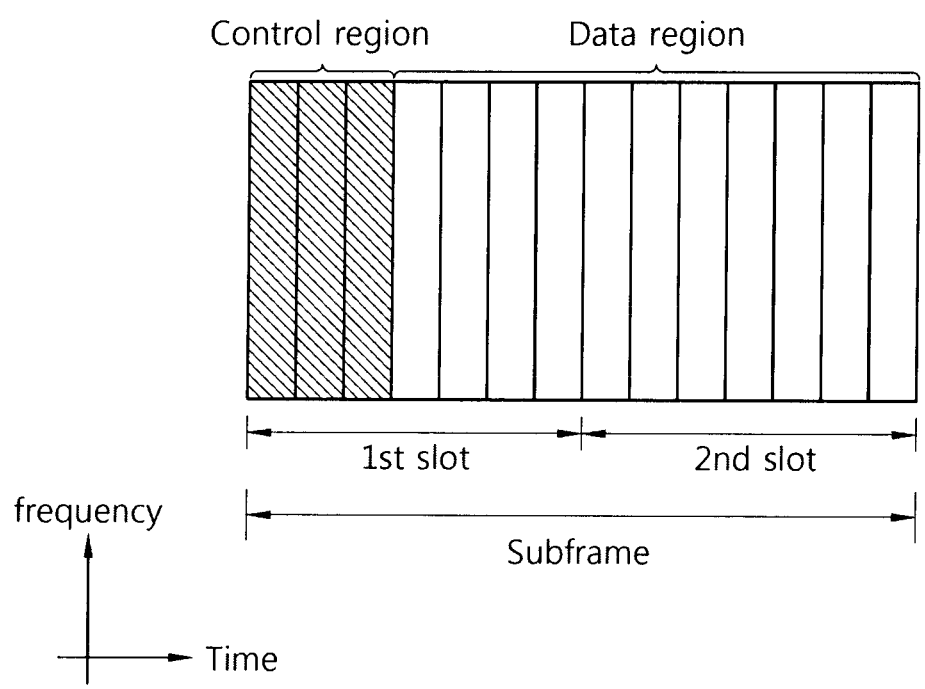
FIG. 3 shows the conventional structure of a DL subframe.

FIG. 3 shows the conventional structure of a DL subframe.

The subframe includes two consecutive slots. Up to first 3 OFDM symbols of a $1^{st}$ slot in the DL subframe correspond to a control region to which a control channel is allocated. The remaining OFDM symbols correspond to a data region to which a data channel is allocated. Herein, the control region includes 3 OFDM symbols for exemplary purposes only.

Examples of the control channel that can be allocated to the control region may include a physical downlink control channel (PDCCH), a physical control format indicator channel (PCFICH), a physical hybrid automatic repeat request (HARQ) indicator channel (PHICH), etc. A UE can read data information transmitted through the data channel by decoding control information transmitted through the PDCCH. The PDCCH will be described below in detail. The number of OFDM symbols included in the control region of the subframe can be known by using the PCFICH. The PHICH carries a hybrid automatic repeat request (HARQ) acknowledgement (ACK)/not-acknowledgment (NACK) signal in response to the UL transmission.

A physical downlink shared channel (PDSCH) can be allocated to the data region. Hereinafter, for convenience of explanation, a control region may be called a PDCCH region, and a data region may be called a PDSCH region.

[PDCCH Structure]

The control region consists of a logical control channel element (CCE) stream which is a plurality of control channel elements. The CCE corresponds to a plurality of resource element groups (REGs). For example, the CCE may correspond to 9 REGs. The REG is used to define mapping of a control channel to a resource element. For example, one REG may consist of four resource elements. The CCE stream denotes a set of all CCEs constituting the control region in one subframe.

A plurality of PDCCHs may be transmitted in the control region. The PDCCH is transmitted on an aggregation of one or several consecutive CCEs. A PDCCH format and the number of available PDCCH bits are determined according to the number of CCEs constituting the CCE aggregation. Hereinafter, the number of CCEs used for PDCCH transmission is referred to as a CCE aggregation level. In addition, the CCE aggregation level is a CCE unit for searching for the PDCCH. A size of the CCE aggregation level is defined by the number of contiguous CCEs. For example, the CCE aggregation level may be defined as a specific number of CCEs, where the specific number is selected from {1, 2, 4, 8}.

Table 1 below shows examples of the PDCCH format and the number of available PDCCH bits according to the CCE aggregation level.

TABLE 1

| PDCCH format | CCE aggregation level | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as DL control information (hereinafter, DCI). The DCI transmits UL scheduling information (called an uplink (UL) grant), DL scheduling information (called a downlink (DL) grant), a UL power control command, control information for paging, control information for indicating a random access channel (RACH) response, etc.

The DCI can be transmitted with a specific format, and its usage can be defined according to each DCI format. For example, the usage of the DCI format can be classified as shown in Table 2 below.

TABLE 2

| DCI format | Contents |
| --- | --- |
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI formal 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |
| DCI format 4 | It is used for PUSCH scheduling in one UL cell in a multi-antenna transmission mode. |

The PDCCH can be generated through the following process. A BS attaches a cyclic redundancy check (CRC) for error detection to DCI to be transmitted to a UE. The CRC is masked with an identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message transmitted through a PCH, a paging indicator identifier (e.g., paging-RNTI (P-RNTI)) may be masked to the CRC. If the PDCCH is for system information transmitted through a downlink shared channel (DL-SCH), a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC. When the C-RNTI is used, the PDCCH carries control information for a corresponding specific UE. When other RNTIs are used, the PDCCH carries common control information received by all UEs in a cell.

Thereafter, channel coding is performed on the CRC-attached control information to generate coded data. Then, rate matching is performed according to a CCE aggregation level assigned to the PDCCH format. Thereafter, the coded data is modulated to generate modulation symbols. The number of modulation symbols constituting one PDCCH may differ depending on a CCE aggregation level (i.e., one value selected from 1, 2, 4, and 8). The modulation symbols are mapped to physical resource elements (REs) (i.e., CCE to RE mapping).

In the 3GPP LTE, the UE uses blind decoding for PDCCH detection. The blind decoding is a scheme in which a desired identifier is de-masked from a CRC of a received PDCCH (referred to as a candidate PDCCH) and an CRC error is checked to determine whether the PDCCH is its own control channel. The blind decoding is performed because the UE cannot know about a specific position in a control region in which its PDCCH is transmitted and about a specific CCE aggregation or DCI format used for PDCCH transmission.

As described above, a plurality of PDCCHs can be transmitted in one subframe. The UE monitors the plurality of PDCCHs in every subframe. Herein, monitoring is an operation in which the UE attempts PDCCH decoding according to a PDCCH format.

The 3GPP LTE uses a search space to reduce an overload caused by blind decoding. The search space can also be called a monitoring set of a CCE for the PDCCH. The UE monitors the PDCCH in the search space.

The search space is classified into a common search space (CSS) and a UE-specific search space (USS). The CSS is a space for searching for a PDCCH having common control information and consists of 16 CCEs indexed with 0 to 15. The CSS supports a PDCCH having a CCE aggregation level of {4,8}. The CSS is reported to all UEs in a cell, and the UE searches for DCI formats 1A, 1C, 3, 3A, etc., in the CSS. A PDCCH for carrying UE-specific information may also be transmitted in the CSS.

The USS is configured for each UE, and supports a PDCCH having a CCE aggregation level of {1, 2, 4, 8}. The UE is not requested to search for all the defined DCI formats simultaneously. This is to decrease the number of blind decoding attempts. The UE always searches for the DCI formats 0, 1A which are identified with a 1-bit flag and have the same length in the USS. In addition, the UE searches for the DCI formats 1, 1B, 2, etc., according to a transmission mode. The transmission mode is described below.

A start point of the search space is defined differently in the CSS and the USS. Although a start point of the CSS is fixed irrespective of a subframe, a start point of the USS may vary in every subframe according to a UE identifier (e.g., C-RNTI), a CCE aggregation level, and/or a slot number in a radio frame. If the start point of the USS exists in the CSS, the USS and the CSS may overlap with each other.

In a CCE aggregation level $L \in \{1, 2, 3, 4\}$, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k+m) \bmod \lfloor N_{CCE,k}/L \rfloor\}+i$$

Herein, $i=0, 1, \ldots, L-1$, $m=0, \ldots, M^{(L)}-1$, and $N_{CCE,k}$ denotes the total number of CCEs that can be used for PDCCH transmission in a control region of a subframe k. The control region includes a set of CCEs numbered from 0 to $N_{CCE,k}-1$. $M^{(L)}$ denotes the number of PDCCH candidates in a CCE aggregation level L of a given search space. In the CSS, $Y_k$ is set to 0 with respect to two aggregation levels L=4 and L=8. In the USS of the CCE aggregation level L, a variable $Y_k$ is defined by Equation 2 below.

$$Y_k=(A \cdot Y_{k-1}) \bmod D$$

Herein, $Y_{-1}=n_{RNTI} \neq 0$, $A=39827$, $D=65537$, $k=\text{floor}(n_s/2)$, and $n_s$ denotes a slot number in a radio frame.

Table 3 below shows the number of PDCCHs in the search space.

TABLE 3

| PDCCH format | The number of CCEs | The number of candidate PDCCHs in CSS | The number of candidate PDCCHs in USS |
|---|---|---|---|
| 0 | 1 | — | 6 |
| 1 | 2 | — | 6 |
| 2 | 4 | 4 | 2 |
| 3 | 8 | 2 | 2 |

Meanwhile, a DL transmission mode between a BS and a UE can be classified into 9 types as follows. The number of transport blocks or codewords included in the PDSCH in each subframe may vary depending on the DL transmission mode.

Transmission mode 1: A mode in which precoding is not performed (a single antenna port transmission mode).

Transmission mode 2: A transmission mode that can be used in 2 or 4 antenna ports using space-frequency block coding (SFBC) (transmit diversity).

Transmission mode 3: An open-loop mode in which rank adaptation based on RI feedback is possible (open-loop spatial multiplexing). The transmit diversity is applicable when a rank is 1. A great delay CDD can be used when the rank is greater than 1.

Transmission mode 4: A mode in which precoding feedback supporting dynamic rank adaptation is applied (closed-loop spatial multiplexing).

Transmission mode 5: Multi-user MIMO

Transmission mode 6: Closed-loop rank-1 precoding

Transmission mode 7: A transmission mode in which a UE-specific reference signal is used.

Transmission mode 8: Dual-layer transmission using antenna ports 7 and 8, or single-antenna port transmission using an antenna port 7 or an antenna port 8 (dual-layer transmission).

Transmission mode 9: Up to 8-layer transmission using antenna ports 7 to 14.

Figure 4:
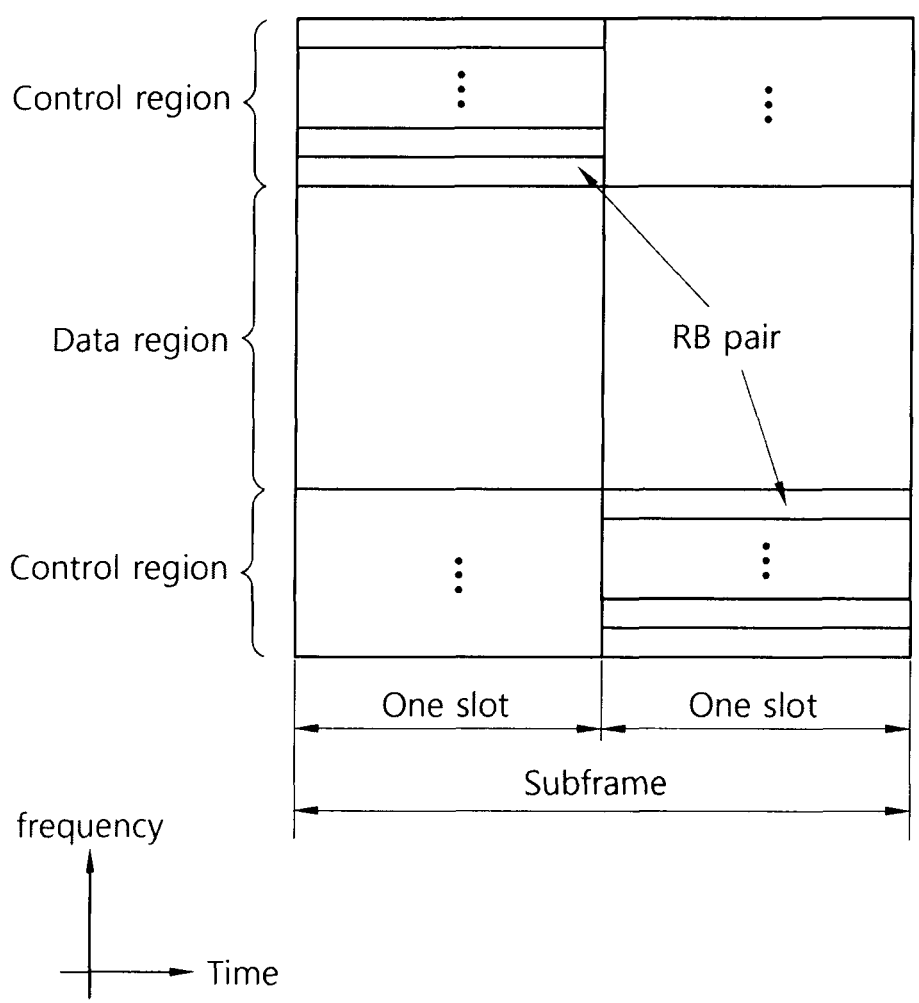
FIG. 4 shows a structure of an uplink (UL) subframe.

FIG. 4 shows a structure of a UL subframe.

Referring to FIG. 4, the UL subframe can be divided into a control region and a data region in a frequency domain. A physical uplink control channel (PUCCH) for transmitting UL control information is allocated to the control region. A physical uplink shared channel (PUSCH) for transmitting data (optionally, control information can be transmitted together) is allocated to the data region. According to a configuration, a UE may simultaneously transmit the PUCCH and the PUSCH, or may transmit any one of the PUCCH and the PUSCH.

The PUCCH for one UE is allocated in an RB pair in a subframe. RBs belonging to the RB pair occupy different subcarriers in each of a $1^{st}$ slot and a $2^{nd}$ slot. A frequency occupied by the RBs belonging to the RB pair allocated to the PUCCH changes at a slot boundary. This is called that the RB pair allocated to the PUCCH is frequency-hopped in a slot boundary. By transmitting UL control information over time through different subcarriers, a frequency diversity gain can be obtained.

A hybrid automatic repeat request (HARQ) acknowledgement (ACK)/non-acknowledgment (NACK) and channel status information (CSI) indicating a DL channel status (e.g., channel quality indicator (CQI), a precoding matrix index (PMI), a precoding type indicator (PTI), a rank indication (RI)) can be transmitted on the PUCCH. Periodic CSI can be transmitted through the PUCCH.

The PUSCH is mapped to an uplink shared channel (UL-SCH) which is a transport channel. UL data transmitted through the PUSCH may be a transport block which is a data block for the UL-SCH transmitted during a TTI. The transport block may include user data. Alternatively, the UL data may be multiplexed data. The multiplexed data may be obtained by multiplexing CSI and a transport block for the UL-SCH. Examples of the CSI multiplexed to the data may include a CQI, a PMI, an RI, etc. Alternatively, the UL data may consist of only CSI. Periodic or aperiodic CSI can be transmitted through the PUSCH.

In the wireless communication system, the UE receives scheduling information such as a DL grant, a UL grant, etc., through the PDCCH, and performs an operation of receiving the PDSCH and transmitting the PUSCH on the basis of the scheduling information. In general, the DL grant and the PDSCH are received in the same subframe. In addition, in case of FDD, the PUSCH is transmitted four subframes later than a subframe in which the UL grant is received. In addition to such dynamic scheduling, LTE also provides semi-persistent scheduling (SPS).

In a DL or UL SPS, a higher-layer signal such as radio resource control (RRC) can be used to report a UE about specific subframes in which semi-persistent transmission/reception is performed. Examples of a parameter given as the higher layer signal may be a subframe period and an offset value.

The UE recognizes semi-persistent transmission through RRC signaling, and thereafter performs or releases SPS PDSCH reception or SPS PUCCH transmission upon receiving an activation or release signal of SPS transmission through a PDCCH. That is, in a case where the activation or release signal is received through the PDCCH instead of directly performing SPS transmission even if SPS scheduling is assigned through RRC signaling, SRS transmission and reception are performed in a subframe corresponding to an offset and a subframe period allocated through RRC signaling by applying a modulation and coding rate based on modulation and coding scheme (MCS) information and a frequency resource (resource block) based on resource block allocation designated in the PDCCH. If an SPS release signal is received through the PDCCH, SPS transmission/reception is suspended. Upon receiving a PDCCH including the SPS activation signal, the suspended SPS transmission/reception is resumed by using an MCS and a frequency resource designated in the PDCCH.

The PDCCH for the SPS configuration/release can be called an SPS allocation PDCCH, and a PDCCH for a normal PUSCH can be called a dynamic PDCCH. The UE can validate whether the PDCCH is the SPS allocation PDCCH when the following conditions are satisfied, that is, 1) CRC parity bits derived from a PDCCH payload must be scrambled with an SPS C-RNTI, and 2) a value of a new data indicator field must be '0'. In addition, when each field value of a PDCCH is determined as shown in the field value of Table 4 below with respect to each DCI format, the UE recognizes DCI information of the PDCCH as SPS activation or release.

TABLE 4

|  | DCI format 0 | DCI format 1/1A | DCI format 2/2A/2B/2C |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

Table 4 above shows an example of a field value of an SPS allocation PDCCH for validating SPS activation.

TABLE 5

|  | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

Table 5 above shows an example of a field value of an SPS release PDCCH for validating SPS release.

Meanwhile, the PUCCH carries various types of control information according to a format. A PUCCH format 1 carries a scheduling request (SR). In this case, an on-off keying (OOK) scheme can be used. A PUCCH format 1a carries an ACK/NACK modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry the CQI and the ACK/NACK. A PUCCH format 3 is modulated using QPSK, and can carry multiple ACK/NACKs and SRs.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 3 below.

$$r_{u(n)} = e^{jb(n)\pi/4} \quad \text{[Equation 3]}$$

In Equation 3, u denotes a root index, and n denotes a component index in the range of where N is a length of the base sequence. b(n) is defined in the section 5.5 of 3GPP TS 36.211 V8.7.0.

A length of a sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

The base sequence r(n) can be cyclically shifted by Equation 4 below to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 4]}$$
$$0 \leq I_{cs} \leq N - 1$$

In Equation 4, $I_{cs}$ denotes a CS index indicating a CS amount ($0 \leq I_{cs} \leq N-1$).

The available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Now, transmission of an HARQ ACK/NACK signal in PUCCH formats 1a/1b will be described.

Figure 5:
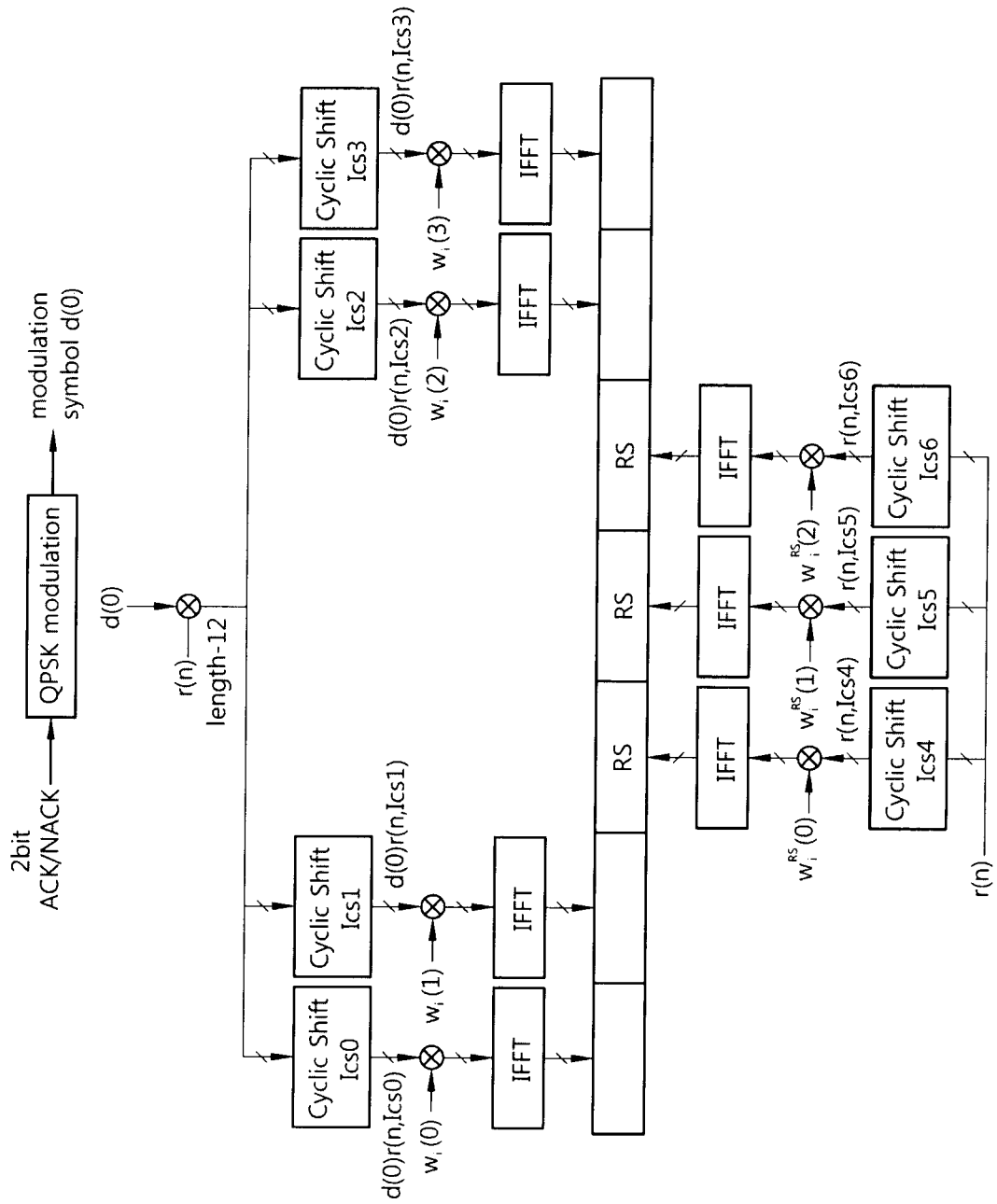
FIG. 5 shows physical uplink control channel (PUCCH) formats 1a/1b in $3^{rd}$ generation partnership project (3GPP) long term evolution (LTE) in a normal cyclic prefix (CP) case.

FIG. 5 shows PUCCH formats 1a/1b in 3GPP LTE in a normal CP case.

One slot includes 7 OFDM symbols. Three OFDM symbols are used as a reference signal (RS) symbol for a reference signal. Four OFDM symbols are used as a data symbol for an ACK/NACK signal.

In the PUCCH format 1b, a modulation symbol d(0) is generated by modulating a 2-bit ACK/NACK signal based on quadrature phase shift keying (QPSK). Unlike this, in the PUCCH format 1a, HARQ ACK/NACK to be transmitted through binary phase shift keying (BPSK) is 1 bit.

A CS index $I_{cs}$ may vary depending on a slot number $n_s$ in a radio frame and/or a symbol index 1 in a slot.

In the normal CP case, there are four data OFDM symbols for transmission of an ACK/NACK signal in one slot. It is assumed that CS indices mapped to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensional spreading sequence mapped to an $(i+1)^{th}$ OFDM symbol in a subframe is denoted by m(i), it can be expressed as follows.

$$\{m(0), m(1), m(2), m(3)\} = \{d(0)r(n, I_{cs0}), d(0)r(n, I_{cs1}), d(0)r(n, I_{cs2}), d(0)r(n, I_{cs3})\}$$

In order to increase UE capacity, the one-dimensional spreading sequence can be spread by using an orthogonal sequence. An orthogonal sequence $w_i(k)$ (where i is a sequence index, $0 \leq k \leq K-1$) having a spread factor K=4 uses the following sequence.

TABLE 6

| Index (i) | [$w_i(0)$, $w_i(1)$, $w_i(2)$, $w_i(3)$] |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 7

| Index (i) | [$w_i(0)$, $w_i(1)$, $w_i(2)$] |
|---|---|
| 0 | [+1, +1, +1] |
| 1 | [+1, $e^{j2\pi/3}$, $e^{j4\pi/3}$] |
| 2 | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

$$\{s(0), s(1), s(2), s(3)\} = \{w_i(0)m(0), w_i(1)m(1), w_i(2)m(2), w_i(3)m(3)\}$$

The two-dimensional spreading sequences {s(0), s(1), s(2), s(3)} are subjected to inverse fast Fourier transform (IFFT) and thereafter are transmitted in corresponding OFDM symbols. Accordingly, an ACK/NACK signal is transmitted on a PUCCH.

A reference signal of the PUCCH format 1b is also transmitted by cyclically shifting the base sequence r(n) and then by spreading it by the use of an orthogonal sequence. When CS indices mapped to three RS OFDM symbols are denoted by $I_{cs4}$, $I_{cs5}$, and $I_{cs6}$, three cyclically shifted sequences $r(n, I_{cs4})$, $r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to configure the PUCCH, and are also resources used to identify the PUCCH (or UE). If the number of available cyclic shifts is 12 and the number of available orthogonal sequence indices is 3, PUCCHs for 36 UEs in total can be multiplexed to one resource block. However, the number of available orthogonal sequence indices in a symbol used as a reference signal may be different from an orthogonal sequence index used in data transmission, and thus the number of UEs capable of supporting multiplexing may be different for each reference signal and data. In this case, a smaller value is the number of UEs which can multiplex the PUCCH to one resource block.

In the 3GPP LTE, a resource index $n^{(1)}_{PUCCH}$ is defined in order for the UE to obtain the three parameters for configuring the PUCCH. $n^{(1)}_{PUCCH}$ is also called a PUCCH index. The resource index $n^{(1)}_{PUUCH}$ is defined to $n_{CCE}+N^{(1)}_{PUUCH}$, where $n_{CCE}$ is an index of a first CCE used for transmission of a corresponding PDCCH (i.e., PDCCH including DL resource allocation used to receive DL data mapped to an ACK/NACK signal), and $N^{(1)}_{PUCCH}$ is a parameter reported by a BS to the UE by using a higher-layer message.

Time, frequency, and code resources used for transmission of the ACK/NACK signal are referred to as ACK/NACK resources or PUCCH resources. If ACK/NACK is transmitted through a PUCCH, the ACK/NACK resource is equivalent to the PUCCH region. As described above, an index of a PUCCH resource or the ACK/NACK resource required to transmit the ACK/NACK signal on the PUCCH can be expressed with at least any one of an orthogonal sequence index i, a CS index $I_{cs}$, a resource block index m, and a PUCCH index $n^{(1)}_{PUCCH}$ for obtaining the three indices.

Channel selection is another method for transmitting ACK/NACK. The channel selection is also called ACK/NACK multiplexing. The UE transmits ACK/NACK by selecting one PUCCH resource among a plurality of PUCCH resources. In this case, if ACK/NACK is transmitted using PUCCH formats 1a/1b through a selected PUCCH resource, it is called channel selection using the PUCCH formats 1a/1b.

For example, assume that M DL subframes are associated with one UL subframe n in TDD, where M=3. Since 3 PDCCHs can be received from 3 DL subframes, the UE can acquire 3 PUCCH resources $n^{(1)}_{PUCCH,0}$, $n^{(1)}_{PUCCH,1}$, $n^{(1)}_{PUCCH,2}$. The conventional PUCCH format 1b can transmit only 2-bit ACK/NACK. However, channel selection can be used to express more ACK/NACK states by linking the allocated PUCCH resources and an actual ACK/NACK signal.

Meanwhile, if it is assumed that M DL subframes are associated with a UL subframe n, ACK/NACK may be mismatched between the BS and the UE due to missing of the DL subframe (or PDCCH).

Assume that M=3, and the BS transmits three DL transport blocks through three DL subframes. The UE misses the PDCCH in the second DL subframe and thus cannot receive a second transport block at all, and can receive only the remaining first and third transport blocks. In this case, if bundling is used, the UE erroneously transmits ACK.

In order to solve this error, a downlink assignment index (DAI) is included in a DL grant on the PDCCH. The DAI indicates an accumulative counter value of the PDCCH which transmits a PDSCH allocated thereto. A value of the 2-bit DAI is increased in an orderly manner starting from 1, and a modulo-4 operation is applicable again from DAI=4. If M=5 and all of 5 DL subframes are scheduled, the DAI can be included in a corresponding PDCCH in the order of DAI=1, 2, 3, 4, 1.

Meanwhile, a PUCCH format 3 may be used to transmit ACK/NACK. The PUCCH format 3 is a PUCCH format which uses a block spreading method. The block spreading method is a method of multiplexing a modulation symbol sequence modulated from multi-bit ACK/NACK by using a block spreading code. The block spreading method can use an SC-FDMA scheme. Herein, the SC-FDMA scheme is a scheme in which IFFT is performed after DFT spreading.

According to the PUCCH format 3, a symbol sequence modulated from multi-bit ACK/NACK is transmitted by being spread in a time domain by using a block spreading code. That is, in the PUCCH format 3, a symbol sequence consisting of one or more symbols is transmitted across a frequency domain of each data symbol, and is transmitted by being spread in the time domain by using the block spreading code. An orthogonal cover code may be used as the block spreading code.

Now, a carrier aggregation system will be described.

[Carrier Aggregation System]

Figure 6:
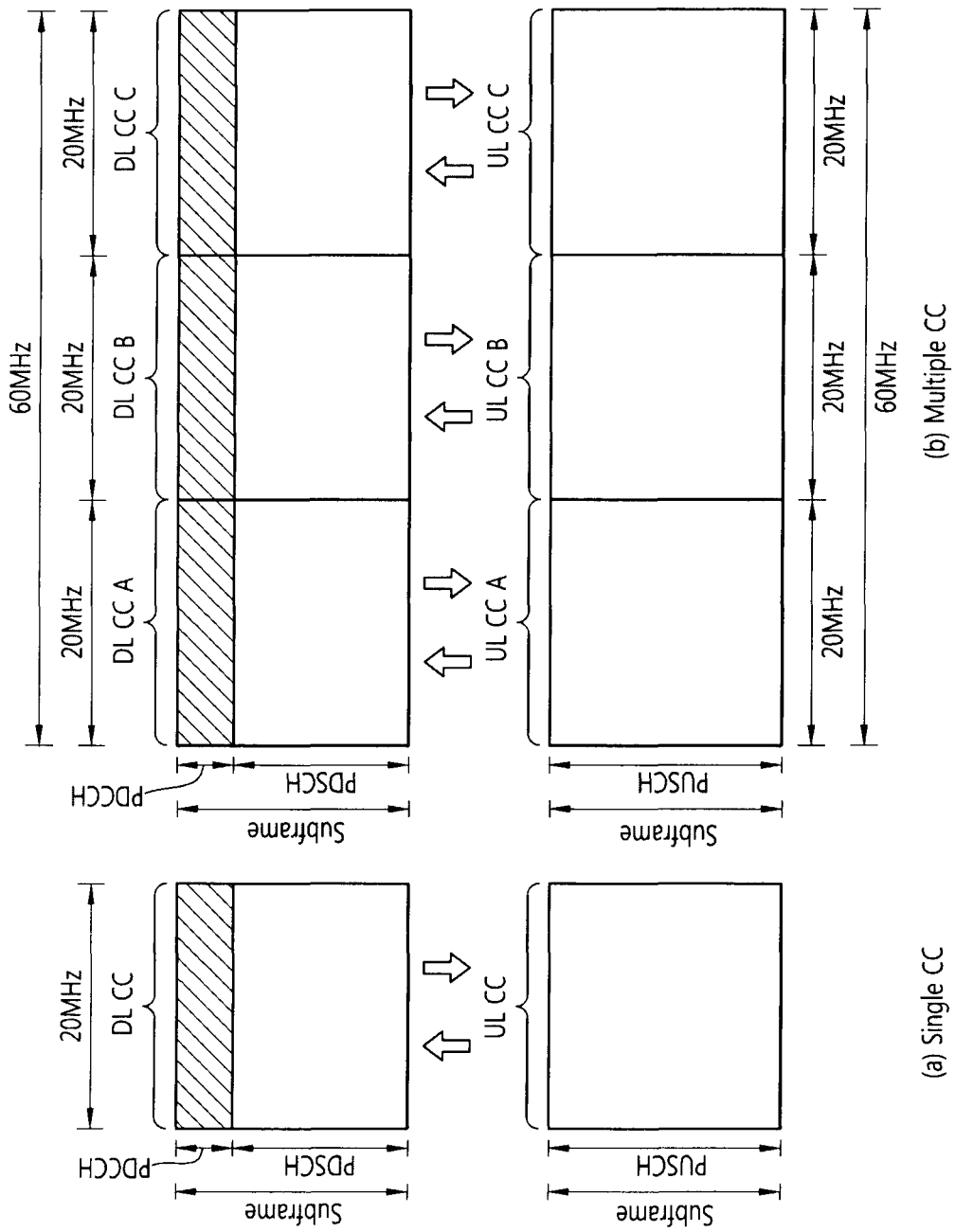
FIG. 6 shows an example of comparing a legacy single-carrier system and a carrier aggregation system.

FIG. 6 shows an example of comparing a legacy single-carrier system and a carrier aggregation system.

Referring to FIG. 6, only one carrier is supported for a UE in an uplink and a downlink in the single-carrier system. Although the carrier may have various bandwidths, only one carrier is assigned to the UE. Meanwhile, multiple component carriers (CCs) (i.e., DL CCs A to C and UL CCs A to C) can be assigned to the UE in the carrier aggregation (CA) system. A CC implies a carrier used in a carrier aggregation system, and can be simply referred to as a carrier. For example, three 20 MHz CCs can be assigned to allocate a 60 MHz bandwidth to the UE.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs can directly use a bandwidth that is used in the legacy system in order to provide backward compatibility with the legacy system. For example, a 3GPP LTE system can support a carrier having a bandwidth of 1.4 MHz, 3 MHz, 5 MHz, 10 MHz, 15 MHz, and 20 MHz, and a 3GPP LTE-A system can configure a broadband of 20 MHz or higher by using each carrier of the 3GPP LTE system as a CC. Alternatively, the broadband can be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if carrier aggregation (CA) is not considered, uplink and downlink frequency resources can always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration can exist in an activation or deactivation state. Herein, the activation implies that data transmission or reception is performed or is in a ready state. The UE can monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE can receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which carrier aggregation is not configured or which cannot provide the carrier aggregation. If the carrier aggregation is configured, the term 'serving cell' is used to indicate a cell configured for the UE, and the cell may be plural in number. One serving cell may consist of one DL CC or a pair of DL CC, UL CC). A plurality of serving cells may be configured with a set consisting of a primary cell and one or a plurality of cells among all secondary cells.

A primary component carrier (PCC) denotes a CC corresponding to the primary cell. The PCC is a CC that establishes an initial connection (or RRC connection) with a BS among several CCs. The PCC serves for connection (or RRC connection) for signaling related to a plurality of CCs, and is a CC that manages a UE context which is connection information related to the UE. In addition, the PCC establishes a connection with the UE, and thus always exists in an activation state when in an RRC connected mode. A downlink CC corresponding to the primary cell is called a downlink primary component carrier (DL PCC), and an uplink CC corresponding to the primary cell is called an uplink primary component carrier (UL PCC).

A secondary component carrier (SCC) denotes a CC corresponding to a secondary cell. That is, the SCC is a CC allocated to the UE in addition to the PCC. The SCC is an extended carrier used by the UE for additional resource allocation or the like in addition to the PCC, and can be in an activation state or a deactivation state. A DL CC corresponding to the secondary cell is called a DL secondary CC (SCC). A UL CC corresponding to the secondary cell is called a UL SCC.

The primary cell and the secondary cell have the following features.

First, the primary cell is used for PUCCH transmission. Second, the primary cell is always activated, whereas the secondary cell is activated/deactivated according to a specific condition. Third, when the primary cell experiences a radio link failure (RLF), RRC re-establishment is triggered. Fourth, the primary cell can be changed by a handover procedure accompanied by a random access channel (RACH) procedure or security key modification. Fifth, non-access stratum (NAS) information is received through the primary cell. Sixth, in case of an FDD system, the primary cell always consists of a pair of a DL PCC and a UL PCC. Seventh, for each UE, a different CC can be configured as the primary cell. Eighth, the primary cell can be replaced only through a handover, cell selection/cell reselection procedure. When adding a new secondary cell, RRC signaling can be used for transmission of system information of a dedicated secondary cell.

Regarding a CC constituting a serving cell, a DL CC can construct one serving cell. Further, the DL CC can be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC can correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC (carrier #0)+20 MHz CC (carrier #1)+20 MHz CC (carrier #2)+20 MHz CC (carrier #3)+5 MHz CC (carrier #4).

As described above, the carrier aggregation system can support multiple component carriers (CCs) unlike a single-carrier system.

The carrier aggregation system can support cross-carrier scheduling. The cross-carrier scheduling is a scheduling method capable of performing resource allocation of a PDSCH transmitted by using a different carrier through a PDCCH transmitted via a specific CC and/or resource allocation of a PUSCH transmitted via another CC other than a CC basically linked to the specific CC. That is, the PDCCH and the PDSCH can be transmitted through different DL CCs, and the PUSCH can be transmitted via a UL CC other than a UL CC linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF).

The carrier aggregation system supporting the cross-carrier scheduling may include a CIF in the conventional downlink control information (DCI) format. In a system supporting the cross-carrier scheduling, e.g., an LTE-A system, the CIF is added to the conventional DCI format (i.e., the DCI format used in LTE) and thus the number of bits can be extended by 3 bits, and the PDCCH structure can reuse the conventional coding scheme, resource allocation scheme (i.e., CCE-based resource mapping), etc.

Figure 7:
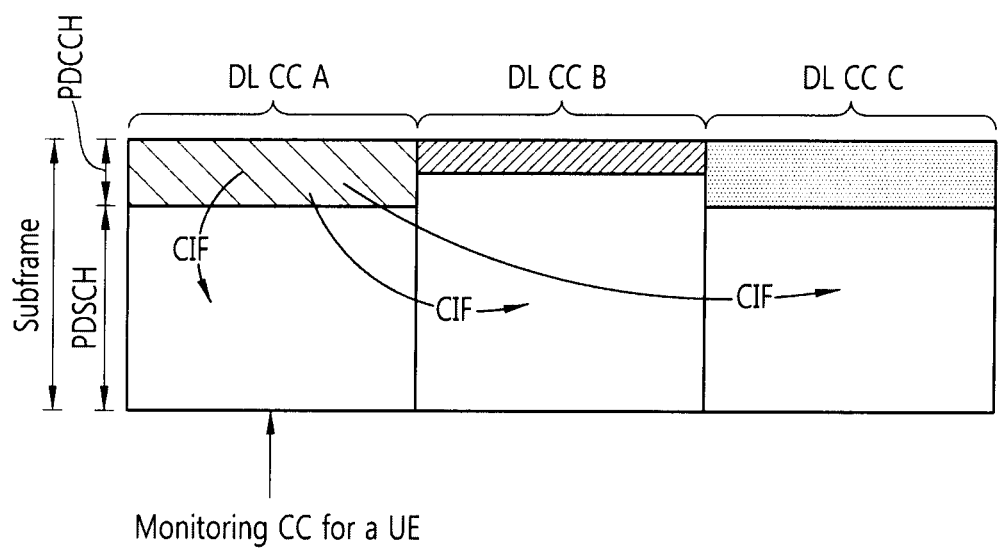
FIG. 7 shows an example of cross-carrier scheduling in a carrier aggregation system.

FIG. 7 shows an example of cross-carrier scheduling in a carrier aggregation system.

Referring to FIG. 7, a BS can configure a PDCCH monitoring DL CC set. The PDCCH monitoring DL CC set consists of some DL CCs among all aggregated DL CCs. When the cross-carrier scheduling is configured, a UE performs PDCCH monitoring/decoding only for a DL CC included in the PDCCH monitoring DL CC set. In other words, the BS transmits a PDCCH for a to-be-scheduled PDSCH/PUSCH only via a DL CC included in the PDCCL monitoring DL CC set. The PDCCH monitoring DL CC set can be determined in a UE-specific, UE group-specific, or cell-specific manner.

In the example of FIG. 7, 3 DL CCs (i.e., DL CC A, DL CC B, DL CC C) are aggregated, and the DL CC A is determined as the PDCCH monitoring DL CC. The UE can receive a DL grant for a PDSCH of the DL CC A, the DL CC B, and the DL CC C through the PDCCH. A CIF may be included in DCI transmitted through the PDCCH of the DL CC A to indicate a specific DL CC for which the DCI is provided.

Figure 8:
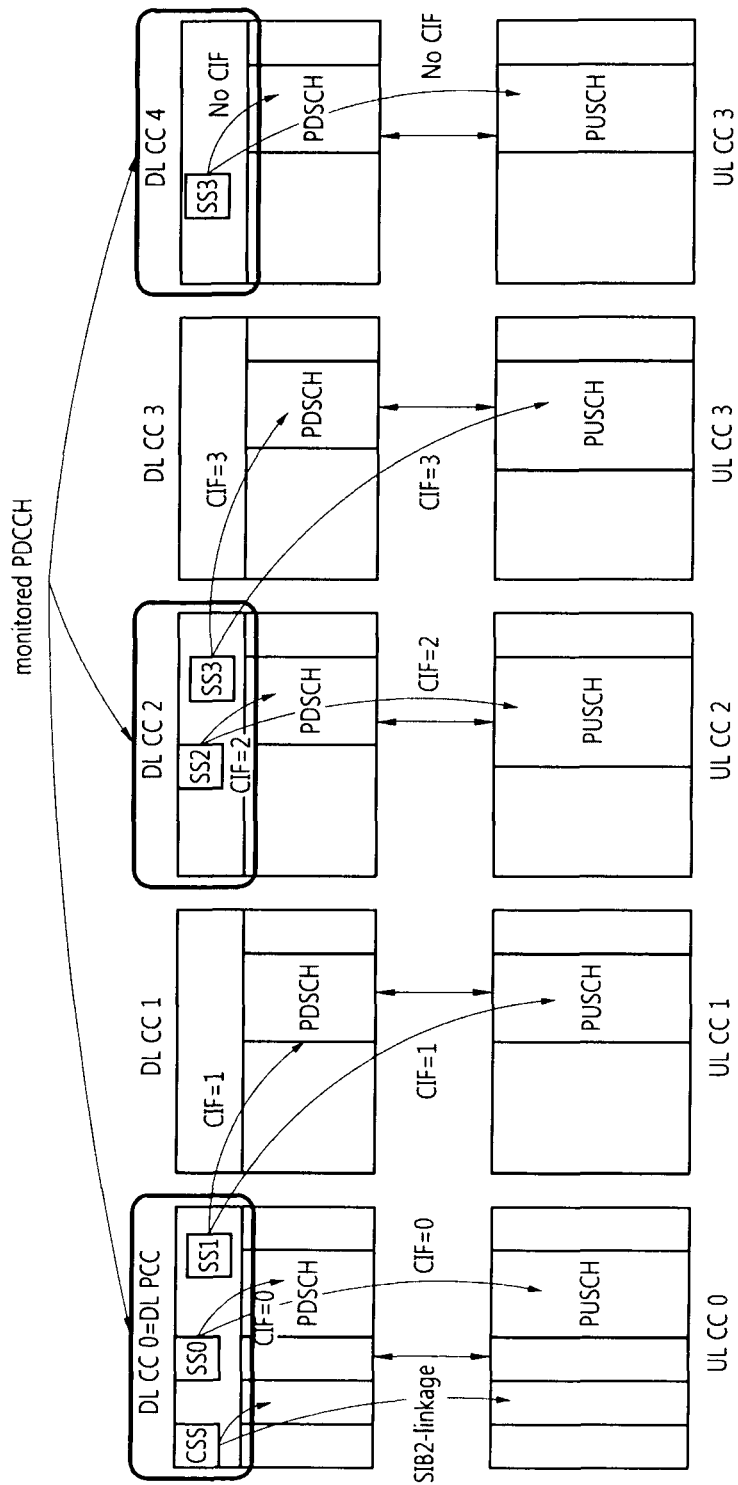
FIG. 8 shows an example of scheduling when cross-carrier scheduling is configured in a carrier aggregation system.

FIG. 8 shows an example of scheduling when cross-carrier scheduling is configured in a carrier aggregation system.

Referring to FIG. 8, a DL CC 0, a DL CC 2, and a DL CC 4 constitute a monitoring DL CC set. A UE searches for a DL grant/UL grant regarding the DL CC 0 and a UL CC 0 (i.e., a UL CC linked to the DL CC 0 by using an SIB2) in a CSS of the DL CC 0. Further, the UE searches for a DL grant/UL grant regarding a DL CC 1 and a UL CC 1 in an SS 1 of the DL CC 0. The SS 1 is an example of a USS. That is, the SS 1 of the DL CC 0 is a search space for searching for the DL grant/UL grant for performing cross-carrier scheduling.

Now, the present invention will be described. In a system enhanced from LTE release 10, a more number of UEs can access to one BS in comparison with the legacy system due to a technique such as machine type communication (MTC), enhanced multi user multi input multi output (MU-MIMO), etc. In this case, it may be difficult to deliver control information to a plurality of UEs by using only the existing control region, i.e., a PDCCH region, in a DL subframe. That is, the control region may be insufficient. In addition, a plurality of RRHs or the like are deployed in a cell, which may cause a problem of an interference in the control region.

In order to solve this problem, additional control information transmission resource allocation is taken into consideration in the enhanced system by configuring an enhanced-PDCCH (E-PDCCH) region. The E-PDCCH region implies a radio resource region to which the E-PDCH can be allocated, and the E-PDCCH implies a control channel for performing control information decoding by using a UE-specific reference signal.

Figure 9:
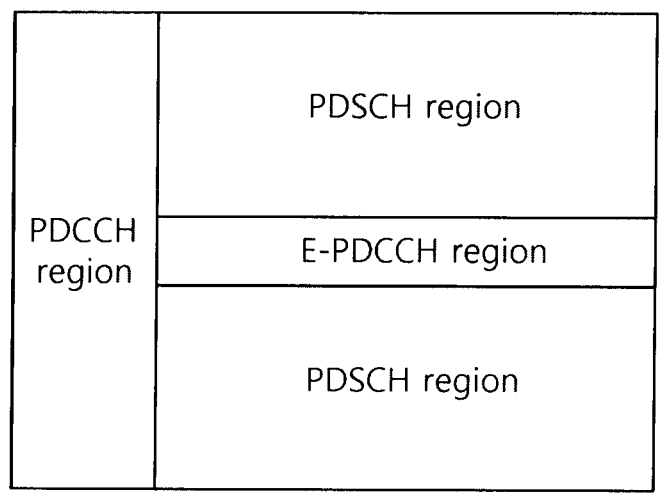
FIG. 9 shows an example of an enhanced-physical downlink control channel (E-PDCCH) region configuration.

FIG. 9 shows an example of an E-PDCCH region configuration.

Referring to FIG. 9, an E-PDCCH region may be configured in some of PDSCH regions to which the existing data channel, i.e., a PDSCH, is allocated. In a time domain, the E-PDCCH region may be subjected to time division multiplexing (TDM) with a PDCCH region, and may be located in a first slot and a second slot of a subframe or both in the two slots. In addition, in a frequency domain, it may be subjected to frequency division multiplexing (FDM) with the PDSCH region. As such, when the E-PDCCH region is allocated to some of the PDSCH regions, an interference problem occurring in the conventional PDCCH region can be solved in a sense that a frequency selective resource allocation is possible. In addition, there is an advantage in that a control region which is insufficient when only using the PDCCH region can be extended.

Figure 10:
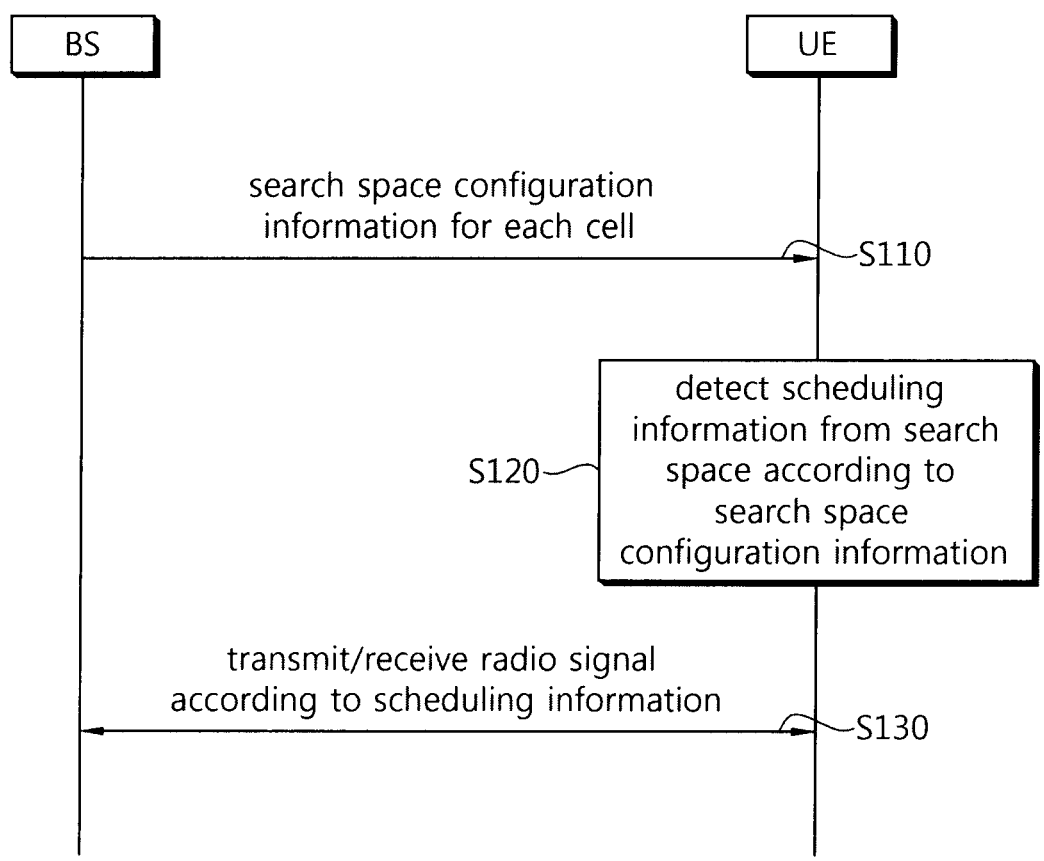
FIG. 10 shows an example of a process of configuring a search space between a base station (BS) and a user equipment (UE) in a carrier aggregation system.

FIG. 10 shows an example of a process of configuring a search space between a BS and a UE in a carrier aggregation system.

Referring to FIG. 10, the BS transmits search space configuration information for each cell (step S110). If an E-PDCCH region is added in addition to the existing PDCCH region, the BS provides the search space configuration information through a higher layer signal such as an RRC message and thus can report to the UE about a specific region for detecting a DL/UL grant which is scheduling information for the UE. In other words, the BS can report to the UE a specific region in which a search space for detecting the DL/UL grant is configured between the PDCCH region and the E-PDCCH region.

The UE detects scheduling information from a specific search space according to the search space configuration information (step S120), and transmits and receives a radio signal according to the scheduling information (step S130). The scheduling information implies information which specifies a resource allocation, required for data transmission and reception such as a DL/UL grant, a transmission method, etc., and is control information which is transmitted through CRC masking by using a UE-specific identifier, for example, a C-RNTI series identifier (i.e., C-RNTI, SPS C-RNTI, etc.).

Hereinafter, methods of configuring a search space in a carrier aggregation system will be described.

First Embodiment

If the search space is configured in an E-PDCCH region in the carrier aggregation system, it can be restricted that the search space is configured only in the E-PDCCH region of a primary cell (more specifically, a DL PCC).

Second Embodiment

In an E-PDCCH region and a PDCCH region, cross-carrier scheduling can be independently configured. That is, whether to configure the cross-carrier scheduling in the PDCCH region and whether to configure the cross-carrier scheduling in the E-PDCCH region may be independent.

Figure 11:
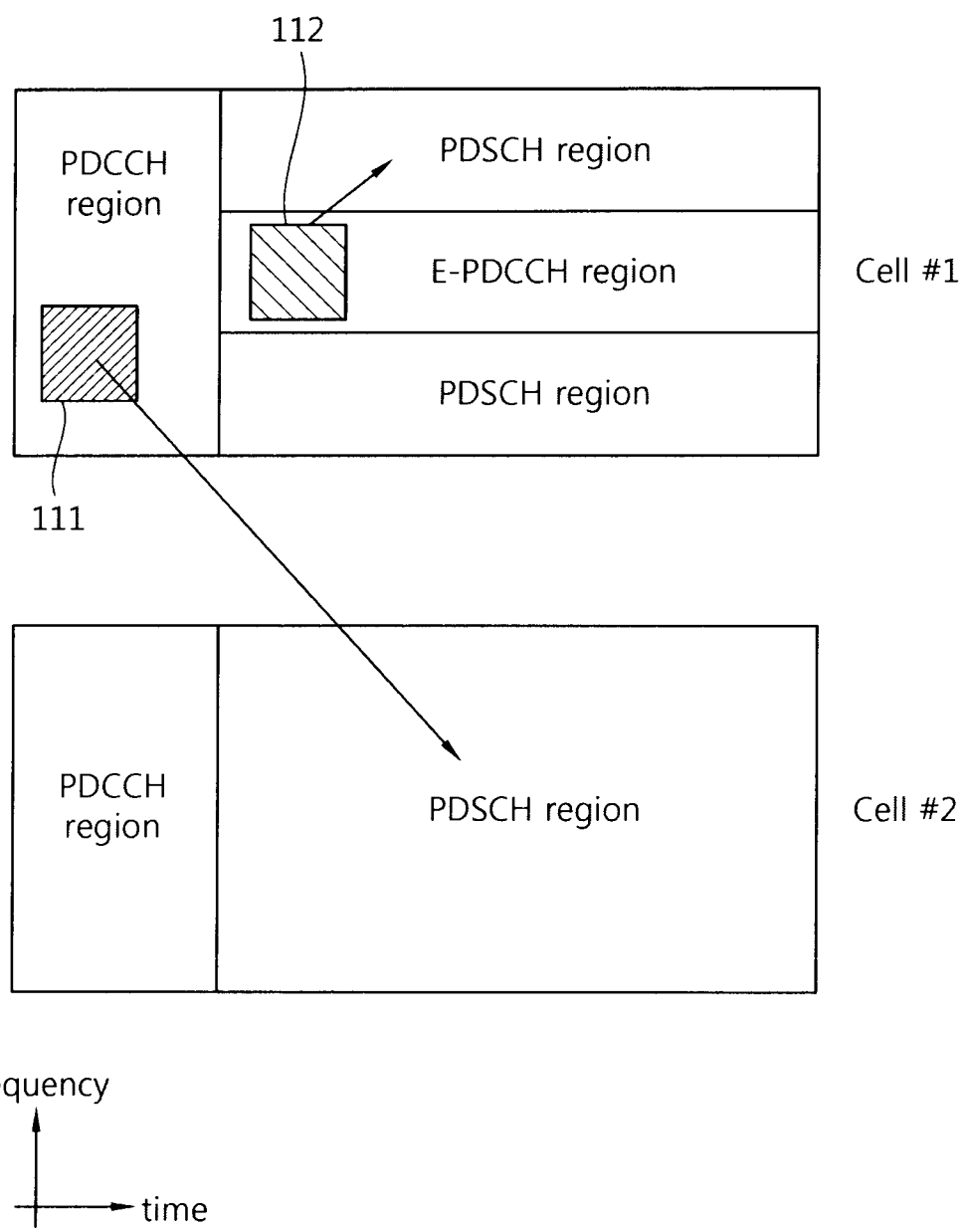
FIG. 11 shows an example of a search space configuration in a carrier aggregation system.

FIG. 11 shows an example of a search space configuration in a carrier aggregation system.

Referring to FIG. 11, search spaces 111 and 112 may be configured in a PDCCH region and an E-PDCCH region of a cell #1. In this case, a DL/UL grant transmitted in the search space 111 which exists in the PDCCH region may be configured to perform cross-carrier scheduling, and a DL/UL grant transmitted in the search space 112 which exists in the E-PDCCH region may be configured to perform self-carrier scheduling (i.e., non-cross carrier scheduling). That is, whether to configure cross-carrier scheduling in the PDCCH region and whether to configure cross-carrier scheduling in the E-PDCCH region may be independent.

Figure 12:
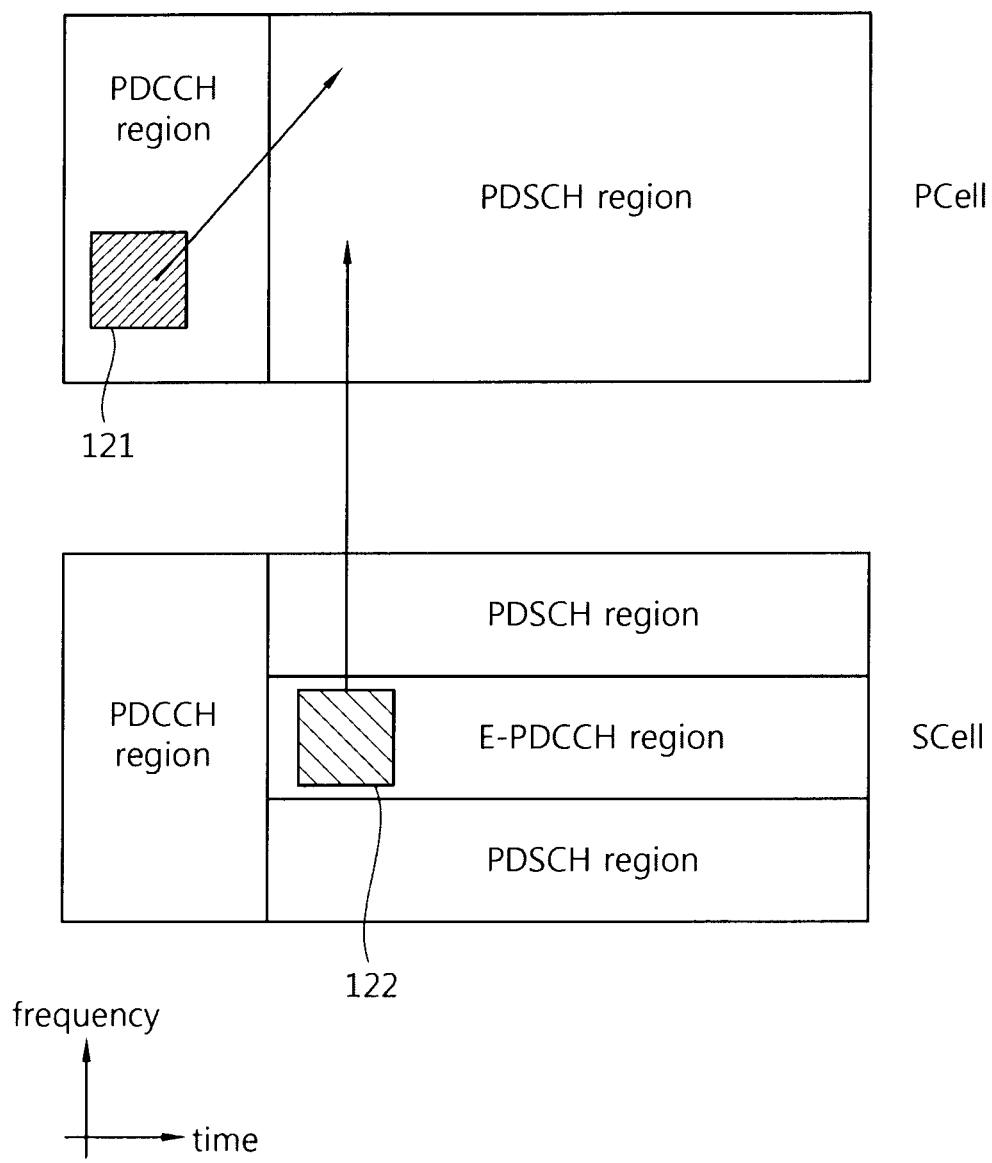
FIG. 12 shows another example of a search space configuration in a carrier aggregation system.

FIG. 12 shows another example of a search space configuration in a carrier aggregation system.

Referring to FIG. 12, if a DL/UL grant for scheduling a data channel (i.e., PDSCH/PUSCH) to be transmitted in a primary cell (PCell) is configured to be transmitted in a PDCCH region, a search space 121 for searching for the DL/UL grant may be configured to be present only in a PDCCH region of the primary cell (more specifically, a DL PCC). That is, if the DL/UL grant is transmitted in the PDCCH region, the primary cell performs only non-cross carrier scheduling.

Otherwise, if the DL/UL grant for scheduling the data channel (i.e., PDSCH/PUSCH) to be transmitted in the primary cell is configured to be transmitted in an E-PDCCH region, a search space 122 for searching for the DL/UL grant may be configured to be present in an E-PDCCH region of a secondary cell. That is, if the DL/UL grant is transmitted in the E-PDCCH region, the DL/UL grant may be configured to be located on the E-PDCCH region of the secondary cell, so that cross-carrier scheduling is performed.

The search space of the PDCCH region needs to perform an operation which utilizes the existing PDCCH, such as an initial network access of the UE, etc. On the other hand, the E-PDCCH region does not have such a limitation, and it is desirable to freely select a more proper cell. To support the aforementioned operation, in a case where the search space is present in the PDCCH region, a cell is indicated in which a search space for detecting a DL/UL grant for scheduling a secondary cell is located when the secondary cell is added. In a case where the search space is present in the E-PDCCH region, RRC signaling may be configured such that a cell in which a PDSCH/PUSCH to be scheduled is located is indicated for each cell in which the E-PDCCH region is located.

In a case where the search space is located in the E-PDCCH region and non-cross carrier scheduling is configured, the E-PDCCH region (or the search space of the E-PDCCH region) in which a DL/UL grant for each cell is transmitted may be configured to be present in each cell.

In a case where the search space is located in the E-PDCCH region and cross-carrier scheduling is configured, a search space in which a DL/UL grant for a plurality of cells is transmitted is configured to be present in a monitoring cell in which the UE monitors the control channel. That is, the search space is configured only in an E-PDCCH region of some cells monitored by the UE, not in all cells aggregated by the UE. If there are a plurality of monitoring cells, the search space may be configured for each monitoring cell or may be configured only one specific monitoring cell (e.g., a primary cell).

Third Embodiment

In a carrier aggregation system, each cell may use a PDCCH region or an E-PDCCH region when performing non-cross carrier scheduling.

Figure 13:
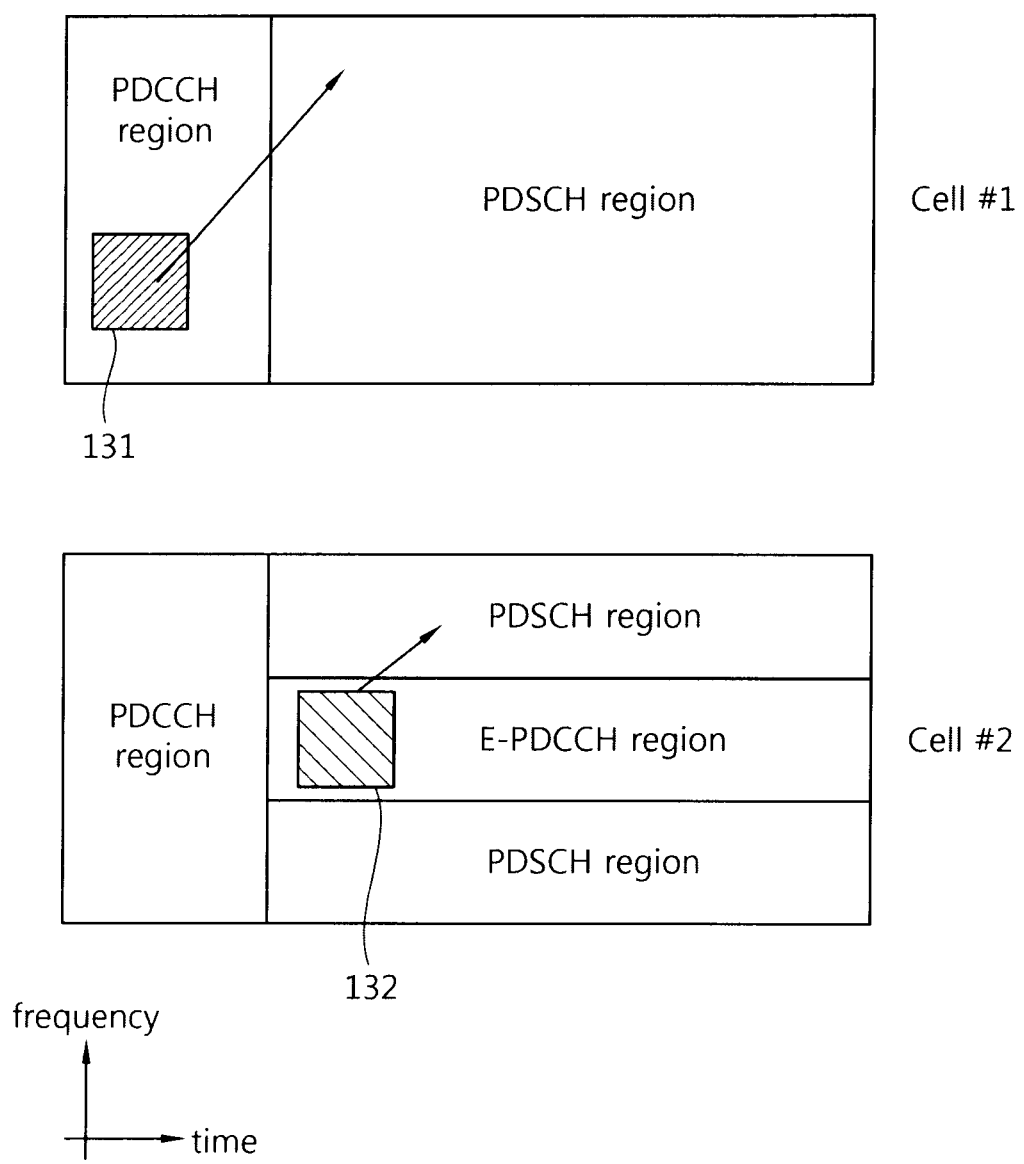
FIG. 13 shows an example of a search space configuration when performing non-cross carrier scheduling in each cell.

FIG. 13 shows an example of a search space configuration when performing non-cross carrier scheduling in each cell.

Referring to FIG. 13, in a cell #1, a search space 131 is configured in a PDCCH region, and in a cell #2, a search space 132 is configured in an E-PDCCH region.

If cross-carrier scheduling is configured in the carrier aggregation system configured as shown in FIG. 13, a search space may be configured such that it exists in a region used when performing non-cross carrier scheduling.

Figure 14:
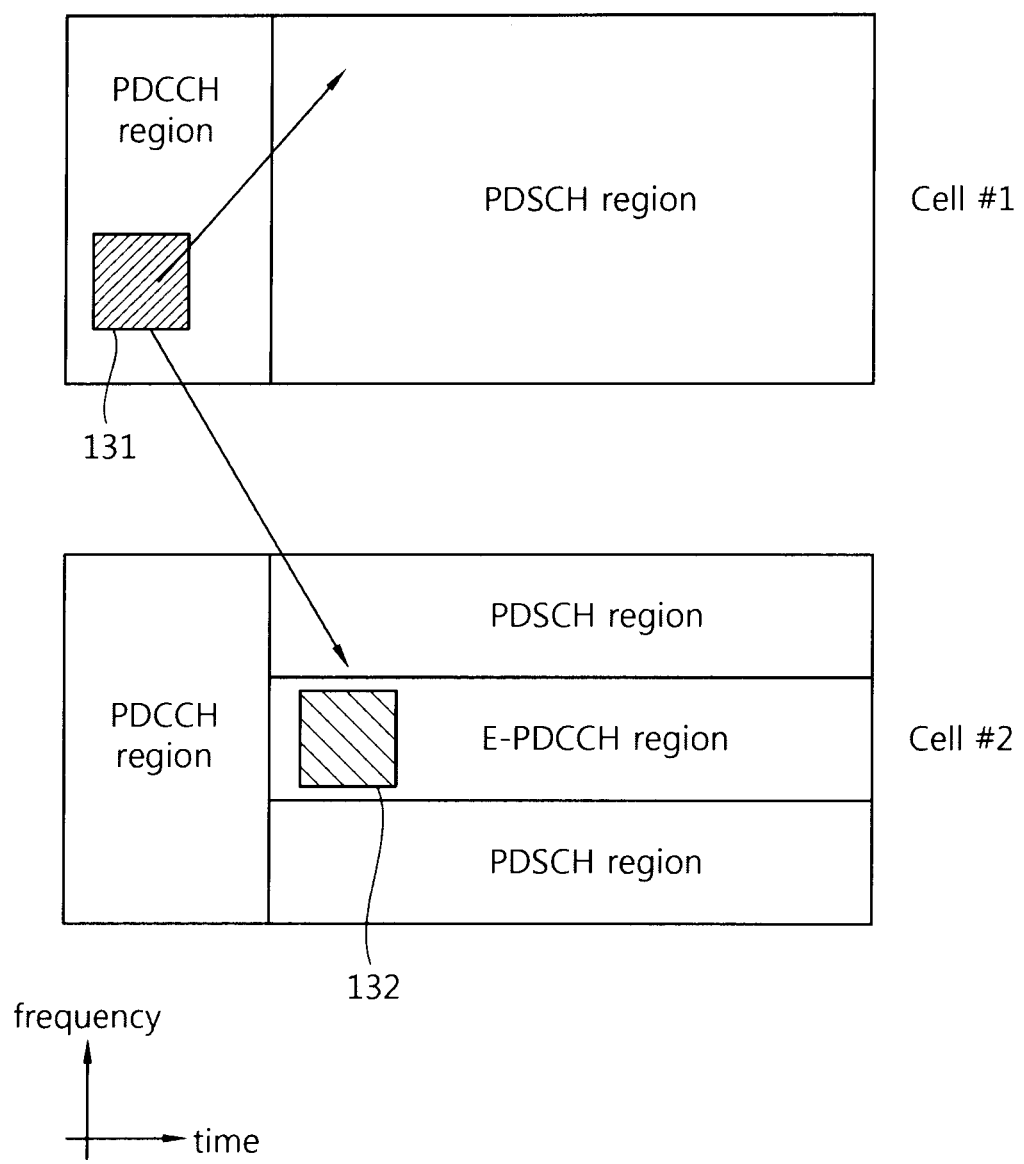
FIG. 14 shows an example of a search space configuration when performing cross-carrier scheduling.

FIG. 14 shows an example of a search space configuration when performing cross-carrier scheduling.

Referring to FIG. 14, a cell #1 may be selected as a cell for transmitting a DL/UL grant for scheduling the cell #1 or a cell #2. In this case, a search space 131 for searching for the DL/UL grant is configured to be present in a PDCCH region of the cell #1. That is, since the search space is present in the PDCCH region when non-cross carrier scheduling (or self-scheduling) is performed in the cell #1, the search space is configured to be present also in the PDCCH region when performing cross-carrier scheduling. In this case, an E-PDCCH region of the cell #2 is not used.

Figure 15:
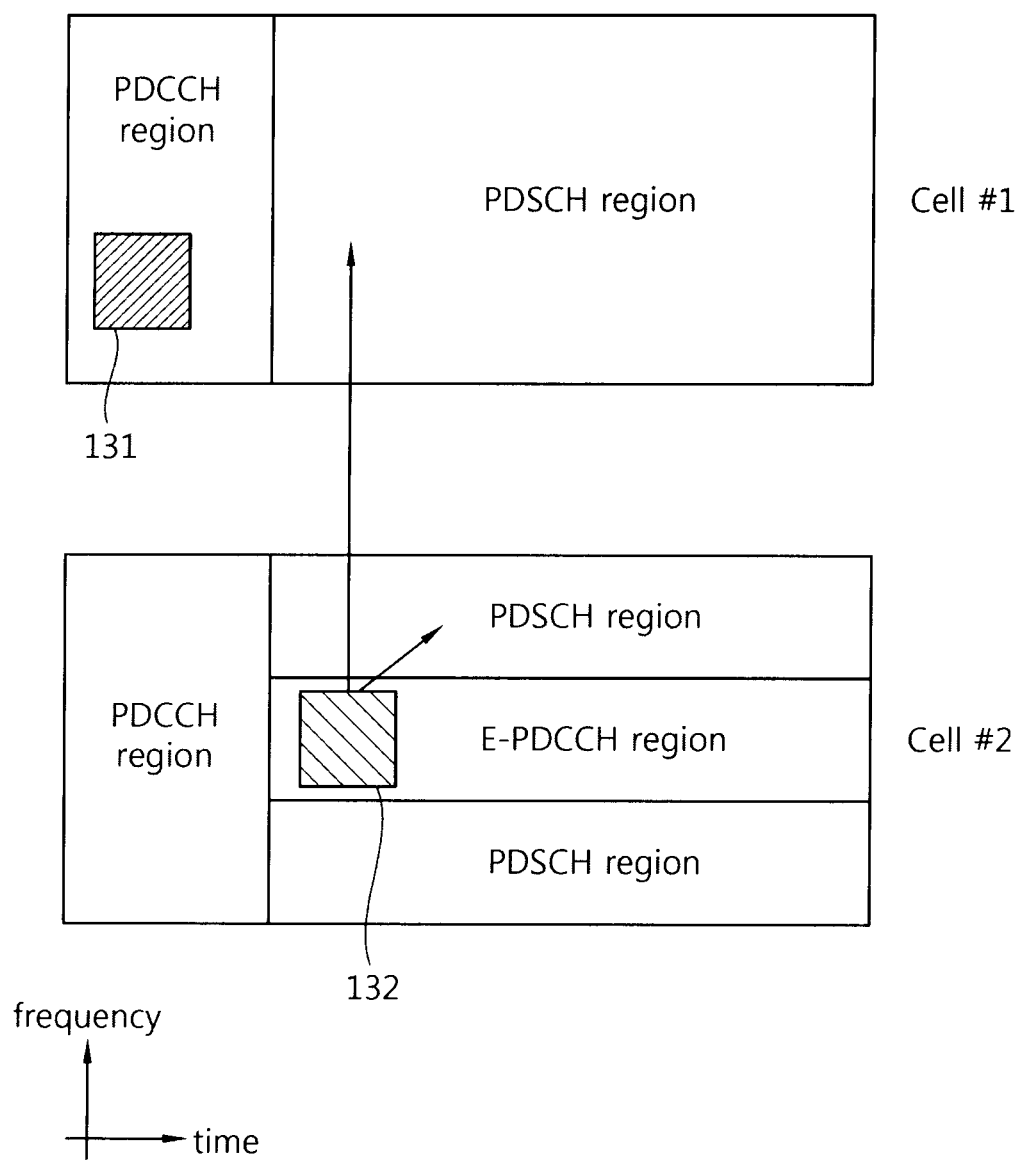
FIG. 15 shows another example of a search space configuration when performing cross-carrier scheduling.

FIG. 15 shows another example of a search space configuration when performing cross-carrier scheduling.

Referring to FIG. 15, a cell #2 may be selected as a cell in which a DL/UL grant for scheduling a cell #1 or the cell #2 is transmitted. In this case, a search space 132 for searching for the DL/UL grant is configured to be present in an E-PDCCH region of the cell #2. That is, since the search space is present in the E-PDCCH region when non-cross carrier scheduling (or self-scheduling) is performed in the cell #2, the search space is configured to be present also in the E-PDCCH region when performing cross-carrier scheduling.

This method is useful when the cell #2 is a new carrier type (NCT) carrier and the cell #1 is a legacy carrier type (LCT) carrier. That is, when cross-carrier scheduling is configured, if scheduling information is transmitted in the LCT cell 1, both of the cells #1 and #2 can be scheduled from a search space of the PDCCH region of the cell #1. Therefore, the conventional cross-carrier scheduling method can be directly used. On the other hand, when non-cross carrier scheduling is configured, the LCT cell #1 transmits scheduling information in the PDCCH region, and the NCT cell #2 transmits scheduling information in the E-PDCCH region.

Figure 16:
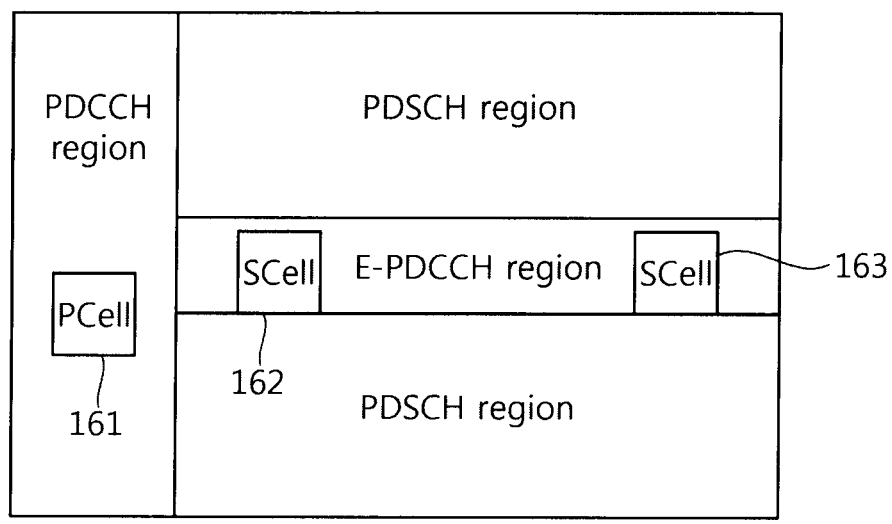
FIG. 16 shows an example of a method of configuring a search space and detecting a DL/UL grant in a carrier aggregation system.

FIG. 16 shows an example of a method of configuring a search space and detecting a DL/UL grant in a carrier aggregation system.

Referring to FIG. 16, a search space may be configured in a PDCCH region and an E-PDCCH region of a specific cell, and a UE may be configured to detect a DL/UL grant in the search space of the E-PDCCH region. In this case, the UE detects the DL/UL grant in a search space 161 of the PDCCH region in a case where a cell for detecting the DL/UL grant is identical to a cell scheduled by the DL/UL grant (in case of self-scheduling). In addition, in a case where the cell for detecting the DL/UL grant is different from a cell scheduled by the DL/UL grant (i.e., in case of cross-carrier scheduling), the DL/UL grant may be searched in search spaces 162 and 163 of the E-PDCCH region.

In the aforementioned method, a cell in which the search space is configured in the PDCCH region when performing self-scheduling may be limited to a cell monitored by the UE or a primary cell when cross-carrier scheduling is configured. If it is limited to the primary cell, even if the search space is configured in the E-PDCCH region, the UE may detect scheduling information for the primary cell in the search space of the PDCCH region, and may detect only scheduling information for the secondary cell in the search space of the E-PDCCH region.

The above method can advantageously utilize a dynamic ACK/NACK resource linked to a CCE on a PDCCH region in which the DL grant for performing self-scheduling is transmitted. For example, if the UE receives only the DL grant for performing the self-scheduling among DL grants for a DL CC of a configured cell, ACK/NACK may be transmitted by using a dynamic ACK/NACK resource linked to the CCE on the PDCCH region in which the DL grant is transmitted. This method can advantageously avoid an erroneous recognition on an ACK/NACK resource between the BS and the UE when the UE exchanges an RRC reconfiguration message with respect to the BS.

If the E-PDCCH region is designated to be used as a search space for searching for a DL/UL grant for scheduling a primary cell in the above methods, some DCI formats (e.g., a fallback DCI format to be described below) may be exceptionally (i.e., only the remaining DCI formats except for the some DCI formats are transmitted through the E-PDCCH) or additionally allowed to be detected through a PDCCH region of a primary cell. More specifically, the search space in the PDCCH region includes a common search space (CSS) and a UE-specific search space (USS), and the fallback DCI format may be transmitted in the CSS and the USS. Herein, the fallback DCI format implies a DCI format that can be used in all transmission modes or a DCI format that is used in an initial access of the UE. Alternatively, more restrictively, the search space in the PDCCH region may be restricted to the CSS, and in this case, only the fallback DCI format may be transmitted in the CSS.

Hereinafter, a method of selecting an ACK/NACK resource according to a location at which a DL grant is received will be described.

A search space in which a DL grant for a specific cell is transmitted may be assigned to a UE both in a PDCCH region and an E-PDCCH region. In this case, if the DL grant for the specific cell is detected from the search space of the E-PDCCH region, an operation of the UE is problematic.

Similarly to the existing PDCCH region, if the E-PDCCH region is divided in a CCE unit and ACK/NACK is transmitted by using a PUCCH region linked to a CCE having a lowest index among CCEs which receive the DL grant, a resource used in PUCCH region is increased, and as a result, a PUSCH resource is decreased. In addition, a collision of the PUCCH resource may occur between a plurality of UEs. In spite of this, if a PUCCH resource linked to a CCE in the E-PDCCH region is defined, it may be configured to perform the same operation as a case of receiving a specific DL grant in a PDCCH. However, instead of this method, it is also possible to use the following method.

An ACK/NACK resource is pre-assigned to a UE through a higher layer signal (e.g., an RRC message). In addition, if a specific DL grant is detected from a search space of an E-PDCCH region, ACK/NACK is transmitted by using the pre-assigned ACK/NACK resource. If a plurality of ACK/NACK resources are assigned, a BS may indicate which ACK/NACK resource will be used by using a specific field (e.g., a transmission power control (TPC) field is used as an ACK/NACK resource indicator (ARI)) of a DL grant transmitted in the search space of the E-PDCCH region.

If the specific DL grant is detected from the search space of the PDCCH region, the UE transmits ACK/NACK by using an ACK/NACK resource corresponding to a CCE having a lowest index for transmitting the DL grant.

In case of FDD, the specific DL grant may be a DL grant for a primary cell. In case of TDD, the specific DL grant may be 1) a DL grant for a primary cell when it is configured to use channel selection of a PUCCH format 1b, and may be 2) a DL grant having DAI=1 for a primary cell when it is configured to use a PUCCH format 3.

If the specific DL grant is detected from the PDCCH region, the UE may interpret that a TPC field is used for transmission power control which is an original usage, whereas if the specific DL grant is detected from the E-PDCCH region, may interpret that the TPC field is used as an ARI to indicate one of a plurality of pre-set PUCCH resources. Since the TPC field is used as the ARI in a DL grant other than the specific DL grant, a TPC field of all DL grants detected from the E-PDCCH region is used as the ARI. Therefore, in a situation where the UE is configured to use the PUCCH format 3, if only a specific DL grant is received in a DL subframe duration corresponding to one UL subframe and is detected from the PDCCH region, it is transmitted by using PUCCH formats 1a/1b corresponding to a CCE as in the conventional operation, whereas if the specific DL grant is detected from the E-PDCCH region, it is transmitted by using the PUCCH format 3 by the use of a PUCCH resource indicated by the ARI. This is because, when the PUCCH format 3 is configured, if the specific DL grant is detected from the PDCCH region, the PUCCH formats 1a/1b corresponding a CCE are used for backward compatibility in an RRC error situation or an RRC reconfiguration duration, whereas if the specific DL grant is detected from the E-PDCCH region, there is no need to consider backward compatibility.

In another method, for better PUCCH transmission than a case of using the PUCCH format 3, if only a specific DL grant is received in a DL subframe duration corresponding to one UL subframe and this is detected from the E-PDCCH region, it may be transmitted by using the PUCCH formats 1a/1b indicated by the ARI.

Figure 17:
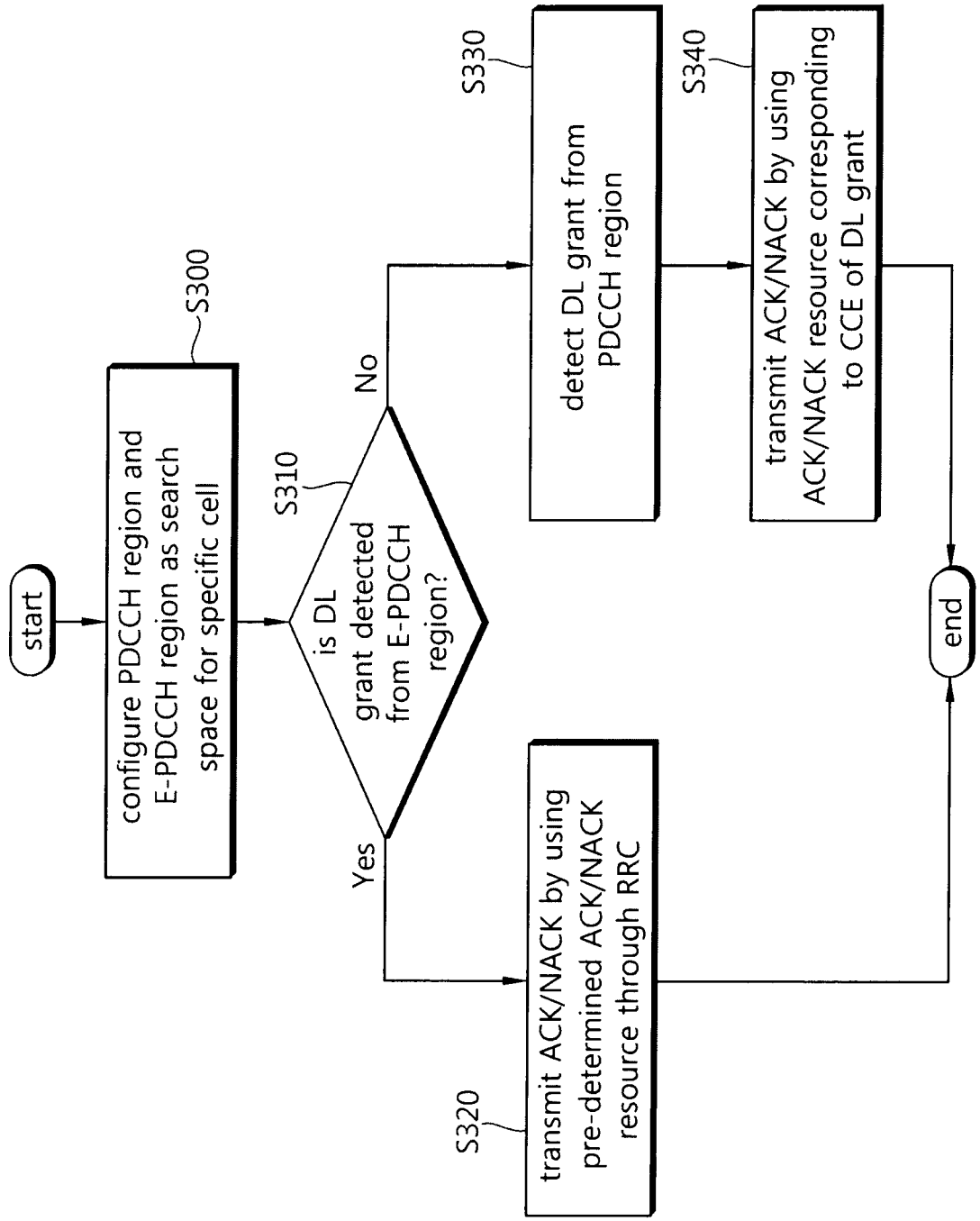
FIG. 17 shows a method of selecting and transmitting an acknowledgement/not-acknowledgement (ACK/NACK) resource according to a location at which a DL grant is received.

FIG. 17 shows a method of selecting and transmitting an ACK/NACK resource according to a location at which a DL grant is received.

Referring to FIG. 17, a PDCCH region and an E-PDCCH region are assigned to a UE as a search space for a specific cell (step S300). Whether the DL grant is detected from the E-PDCCH region is determined (step S310), and if so, ACK/NACK is transmitted by using a pre-determined ACK/NACK resource through RRC (step S320). Otherwise, if the DL grant is detected from the PDCCH region (step S330), ACK/NACK is transmitted by using an ACK/NACK resource corresponding to a CCE of the DL grant (step S340).

Meanwhile, a situation may occur in which the E-PDCCH region collides with a resource block constituting a scheduled PDSCH.

For example, if a UE receives scheduling for a PDSCH of a specific cell through a DL grant transmitted through a search space of a PDCCH region or a search space of a PDCCH/E-PDCCH region of a previous DL subframe, the following operation may be performed in a DL subframe in which the PDSCH is scheduled.

1. DL grant detection for a corresponding cell is not attempted in an E-PDCCH region of a corresponding DL subframe.

2. A BS schedules the PDSCH and E-PDCCH regions by avoiding overlapping. That is, the BS avoids overlapping of the PDSCH and E-PDCCH regions when scheduling the PDSCH.

3. In case of the PDSCH, the E-PDCCH region is unconditionally punctured or rate-matched. This method can avoid an error in case of missing E-PDCCH scheduling existing in the PDSCH region.

The aforementioned methods 1 to 3 may be applied only when a PDSCH is scheduled without a DL grant. For example, it may be applied only when the BS transmits the PDSCH through DL SPS. Although the BS can perform scheduling by avoiding a collision of the PDSCH and E-PDCCH regions in the presence of the DL grant, the collision is inevitable when the PDSCH is scheduled with the SPS in the absence of the DL grant. Therefore, the aforementioned methods 1 to 3 are applied in this case.

The following method can be applied when SPS scheduling is performed.

When resource blocks including an E-PDCCH region are allocated by using a normal DL grant, if an operation of puncturing or rate-matching the E-PDCCH region is performed in the resource blocks, the puncturing or rate-matching operation is not allowed to be performed on a region which collides with an E-PDCCH region of a DL subframe in which a PDSCH is scheduled without a corresponding DL grant by SPS scheduling. That is, the colliding region is recognized as a PDSCH transmission region. The puncturing implies that data is punctured after being carried on a corresponding region, and the rate-matching implies that data is not carried on the corresponding region but is carried on the remaining regions to meet a transmission rate. Such an operation may include or exclude a subframe in which a PDCCH/E-PDCCH indicating an SPS activation is transmitted. In addition, it can be selectively applied according to whether the control channel indicating the SPS activation is transmitted through the PDCCH or the E-PDCCH.

The aforementioned methods may be applied respectively when an E-PDCCH region in which a CSS is configured and an E-PDCCH region in which a USS is configured exist separately. For example, a CSS region may use the method 3, and a USS region may use the methods 1 and 2.

Figure 18:
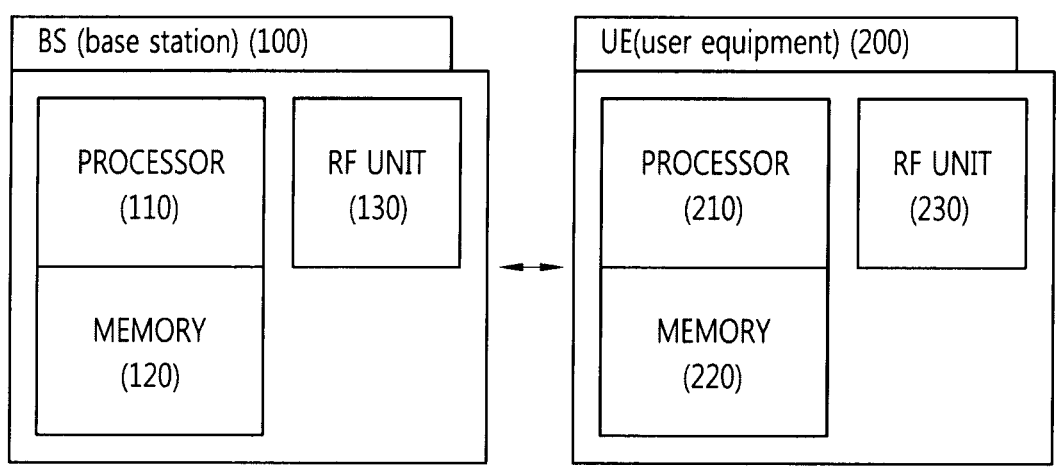
FIG. 18 shows a structure of a BS and a UE according to an embodiment of the present invention.

FIG. 18 shows a structure of a BS and a UE according to an embodiment of the present invention.

A BS 100 includes a processor 110, a memory 120, and a radio frequency (RF) unit 130. The processor 110 implements the proposed functions, procedures, and/or methods. For example, the processor 110 transmits search space configuration information for configuring a search space for each cell to the UE, and transmits scheduling information in the search space. The search space may be configured to at least one of a PDCCH region (also called a first control region) and an E-PDCCH region (also called a second control region). In addition, ACK/NACK transmitted by the UE is received by using a radio resource determined according to a region in which the scheduling information is transmitted. The memory 120 is coupled with the processor 110, and stores a variety of information for driving the processor 110. The RF unit 130 is coupled with the processor 110, and transmits and/or receives a radio signal.

A UE 200 includes a processor 210, a memory 220, and an RF unit 230. The processor 210 implements the proposed functions, procedures, and/or methods. For example, the processor 210 receives search space configuration information for each cell and thus can know where a search space for a specific cell is located between a PDCCH region and an E-PDCCH region. In addition, the processor 210 receives a data channel on the basis of the scheduling information received in the search space, and transmits ACK/NACK for the data channel. Herein, an ACK/NACK transmission resource is determined between a pre-set resource or a dynamic resource linked to a CCE for receiving the scheduling information according to in which control region the scheduling information is present. The memory 220 is coupled with the processor 210, and stores a variety of information for driving the processor 210. The RF unit 230 is coupled with the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of monitoring downlink control information (DCI) for a user equipment (UE) in a wireless communication system, the method comprising:
   receiving configuration information specifying whether to detect the DCI in an enhanced physical downlink control channel (EPDCCH) region; and
   monitoring the DCI in at least one of a physical downlink control channel (PDCCH) region and the EPDCCH region based on the configuration information,
   wherein based on the configuration information specifying that the DCI is detected in the EPDCCH region, a first DCI format is monitored in a common search space (CSS) of the PDCCH region and a second DCI format is monitored in a user equipment specific search space (USS) of the EPDCCH region, and
   wherein the first DCI format is DCI format 0 which is used for scheduling a physical uplink shared channel (PUSCH) or DCI format 1A which is used for scheduling a physical downlink shared channel (PDSCH).

2. The method of claim 1, wherein the configuration information is received through a radio resource control (RRC) message.

3. The method of claim 1, wherein the second DCI format is different from the first DCI format.

4. The method of claim 1, wherein the second DCI format is same to the first DCI format.

5. The method of claim 1, wherein the PDCCH region is located in a first number of orthogonal frequency division multiplexing (OFDM) symbols and the EPDCCH region is located in a second number of the OFDM symbols which are located after the first number of OFDM symbols.

6. The method of claim 1, wherein a plurality of serving cells are configured for the UE.

7. A user equipment (UE), the UE comprising:
   a transceiver; and
   a processor, operatively coupled to the transceiver, wherein the processor is configured to:
   receive configuration information specifying whether to detect the DCI in an enhanced physical downlink control channel (EPDCCH) region, and
   monitor the DCI in at least one of a physical downlink control channel (PDCCH) region and the EPDCCH region based on the configuration information,
   wherein based on the configuration information specifying that the DCI is detected in the EPDCCH region, a first DCI format is monitored in a common search space (CSS) of the PDCCH region and a second DCI format is monitored in a user equipment specific search space (USS) of the EPDCCH region, and
   wherein the first DCI format is DCI format 0 which is used for scheduling a physical uplink shared channel (PUSCH) or DCI format 1A which is used for scheduling a physical downlink shared channel (PDSCH).

8. The UE of claim 7, wherein the configuration information is received through a radio resource control (RRC) message.

9. The UE of claim 7, wherein the second DCI format is different from the first DCI format.

10. The UE of claim 7, wherein the second DCI format is same to the first DCI format.

11. The UE of claim 7, wherein the PDCCH region is located in a first number of orthogonal frequency division multiplexing (OFDM) symbols and the EPDCCH region is located in a second number of the OFDM symbols which are located after the first number of OFDM symbols.

12. The UE of claim 7, wherein a plurality of serving cells are configured for the UE.

13. A processor for a wireless communication device in a wireless communication system,
   wherein the processor is configured to control the wireless communication device to:
   receive configuration information specifying whether to detect the DCI in an enhanced physical downlink control channel (EPDCCH) region, and
   monitor the DCI in at least one of a physical downlink control channel (PDCCH) region and the EPDCCH region based on the configuration information,
   wherein based on the configuration information specifying that the DCI is detected in the EPDCCH region, a first DCI format is monitored in a common search space (CSS) of the PDCCH region and a second DCI format is monitored in a user equipment specific search space (USS) of the EPDCCH region, and
   wherein the first DCI format is DCI format 0 which is used for scheduling a physical uplink shared channel (PUSCH) or DCI format 1A which is used for scheduling a physical downlink shared channel (PDSCH).

14. The processor of claim 13, wherein the configuration information is received through a radio resource control (RRC) message.

15. The processor of claim 13, wherein the second DCI format is different from the first DCI format.

16. The processor of claim 13, wherein the second DCI format is same to the first DCI format.

17. The processor of claim 13, wherein the PDCCH region is located in a first number of orthogonal frequency division multiplexing (OFDM) symbols and the EPDCCH region is located in a second number of the OFDM symbols which are located after the first number of OFDM symbols.

18. The processor of claim 13, wherein a plurality of serving cells are configured for the UE.

* * * * *